US010628427B2

United States Patent
Evnine et al.

(10) Patent No.: US 10,628,427 B2
(45) Date of Patent: Apr. 21, 2020

(54) METHODS AND SYSTEMS FOR ASSIGNING AFFINITY SCORES TO CONTACTS

(71) Applicant: Facebook, Inc., Menlo Park, CA (US)

(72) Inventors: Ariel Benjamin Evnine, Oakland, CA (US); Zeev Rosenstein, Menlo Park, CA (US); Han Gyul Lee, Menlo Park, CA (US); Aman Dhesi, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 593 days.

(21) Appl. No.: 15/167,958

(22) Filed: May 27, 2016

(65) Prior Publication Data

US 2017/0344610 A1 Nov. 30, 2017

(51) Int. Cl.
*G06F 16/2457* (2019.01)
*G06F 16/9535* (2019.01)

(52) U.S. Cl.
CPC .... *G06F 16/24575* (2019.01); *G06F 16/9535* (2019.01)

(58) Field of Classification Search
CPC ......... G06F 17/30528; G06F 17/30867; G06F 16/24575; G06F 16/9535
See application file for complete search history.

(56) References Cited

U.S. PATENT DOCUMENTS

| | | | |
|---|---|---|---|
| 9,275,419 B1* | 3/2016 | Aguiar Marcano | G06F 16/9535 |
| 2008/0059576 A1* | 3/2008 | Liu | G06Q 10/10 709/204 |
| 2014/0067826 A1* | 3/2014 | Jackson | G06Q 50/01 707/748 |
| 2014/0189019 A1* | 7/2014 | Hudack | H04L 67/306 709/206 |
| 2014/0195549 A1* | 7/2014 | Ahn | H04L 51/32 707/749 |
| 2014/0222815 A1* | 8/2014 | Roth | H04L 51/22 707/736 |
| 2014/0324582 A1* | 10/2014 | Suleman | G06Q 30/0256 705/14.54 |
| 2014/0324870 A1* | 10/2014 | Kami | G06K 9/6215 707/737 |
| 2015/0178284 A1* | 6/2015 | Garg | H04L 67/10 707/748 |
| 2015/0205785 A1* | 7/2015 | Beckwith | G06Q 10/00 707/738 |

(Continued)

*Primary Examiner* — Grace Park
*Assistant Examiner* — Hubert Cheung

(57) ABSTRACT

Exemplary embodiments relate to techniques for determining social networking or messaging user affinity and engagement coefficients (e.g., a measure of the connectedness between two people in a network). The described techniques are particularly well-suited to cases in which only limited information is available, such as when a new user joins a network and only the user's contacts list is available. The available information may be used to determine a group of existing users to which the new user is connected. Some embodiments relate to calculating scores among these existing users in order to infer an affinity for the new user to the existing users. Other embodiments involve calculating bilateral scores that reflect a degree of mutual affinity between two users.

10 Claims, 25 Drawing Sheets

(56) References Cited

U.S. PATENT DOCUMENTS

| | | | |
|---|---|---|---|
| 2015/0370798 A1* | 12/2015 | Ju | G06F 16/9535 |
| | | | 707/748 |
| 2016/0117329 A1* | 4/2016 | Busey | G06F 16/24578 |
| | | | 707/726 |
| 2016/0124925 A1* | 5/2016 | Fleischman | G06F 16/23 |
| | | | 715/738 |
| 2016/0292163 A1* | 10/2016 | He | G06F 16/9535 |
| 2017/0099240 A1 | 4/2017 | Evnine et al. | |
| 2017/0161278 A1* | 6/2017 | Carr | G06F 16/24575 |
| 2017/0185601 A1 | 6/2017 | Qin et al. | |
| 2017/0195125 A1* | 7/2017 | Heppe | H04L 9/3247 |

* cited by examiner

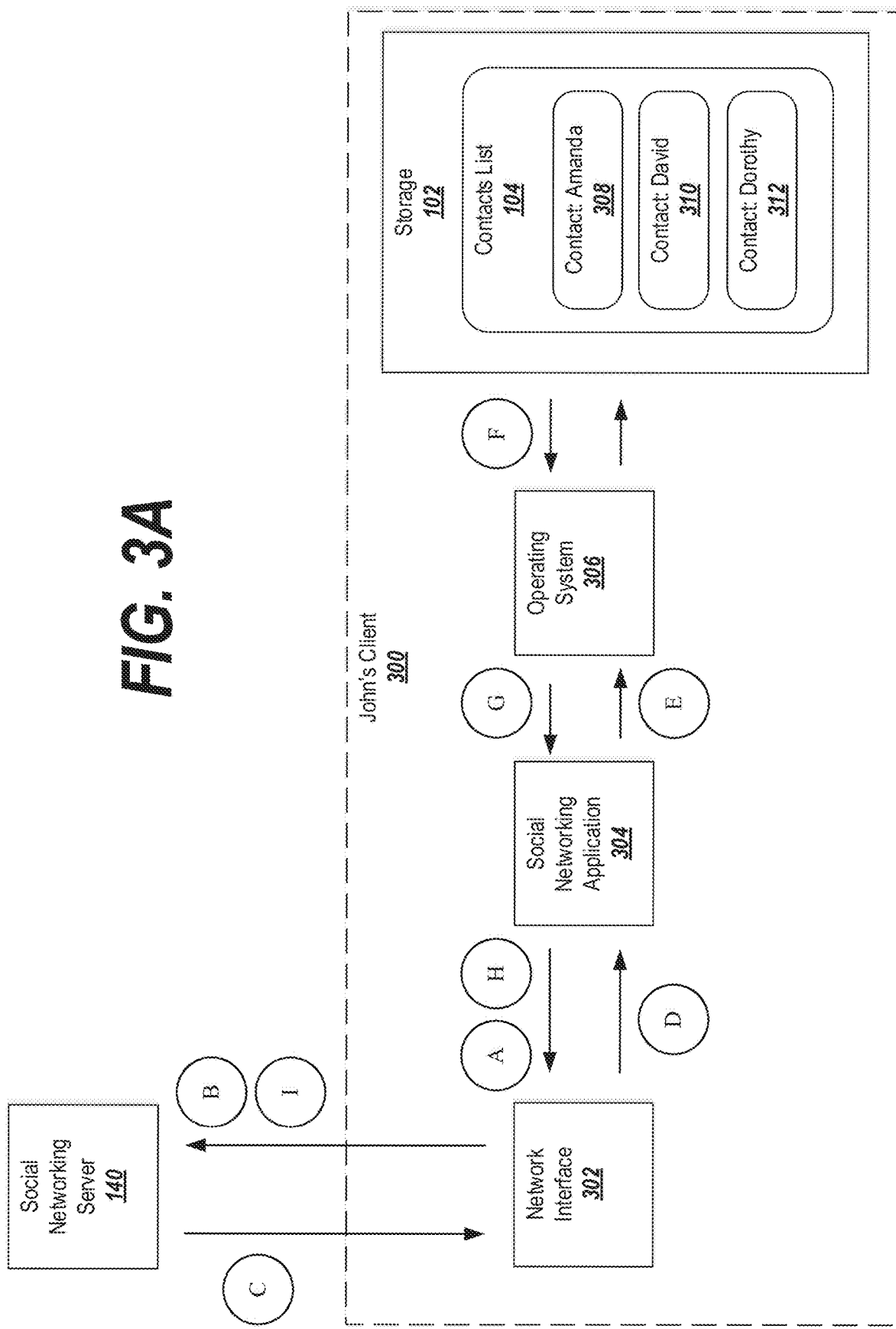

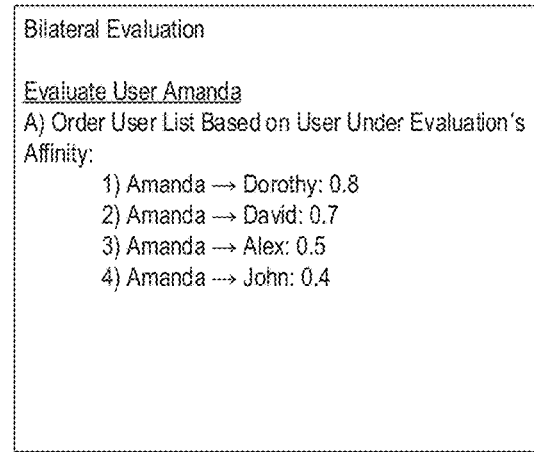
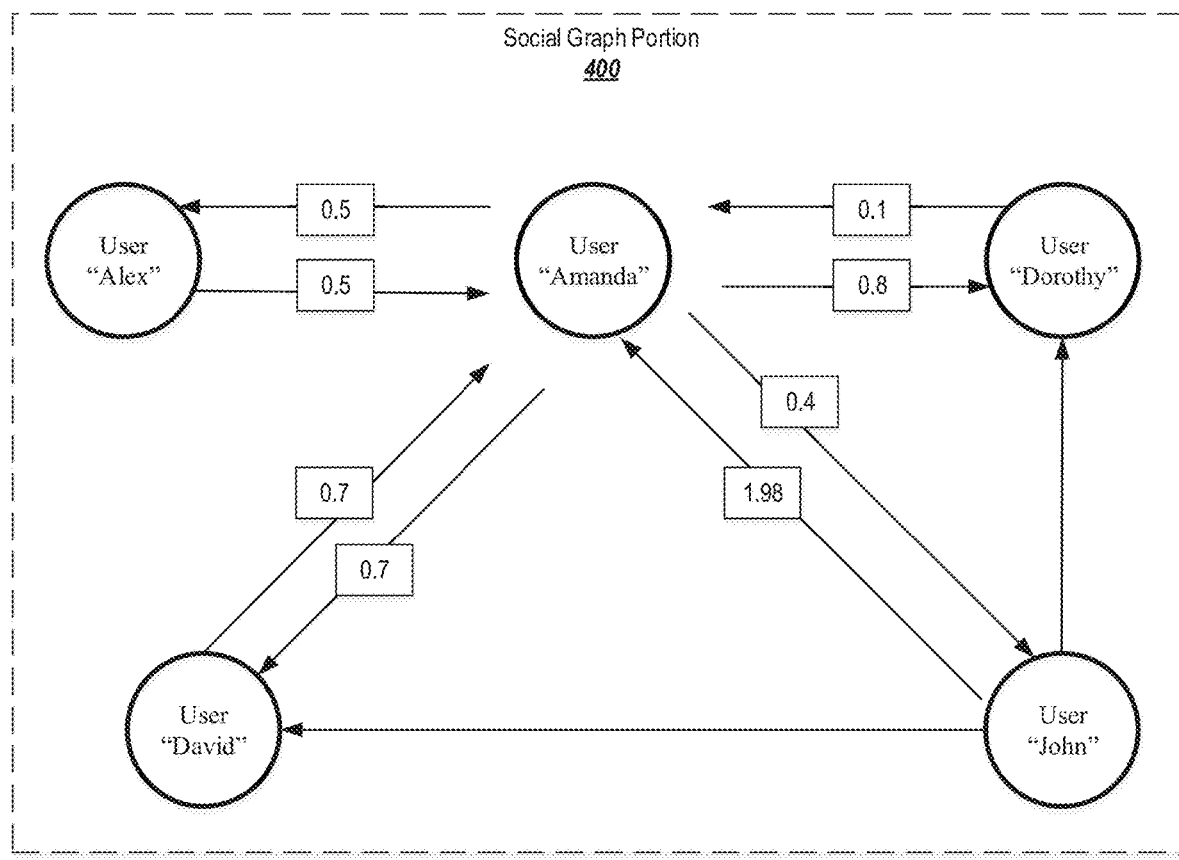
FIG. 4B

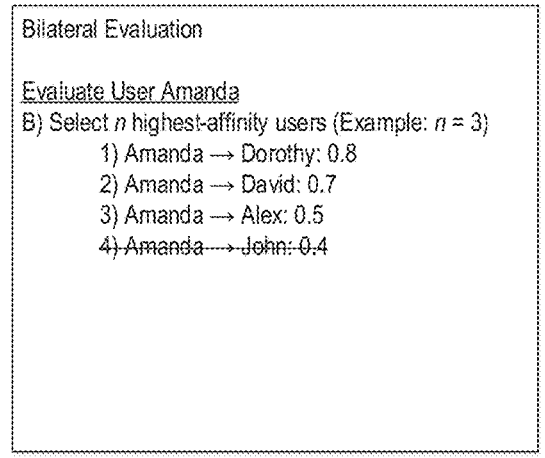
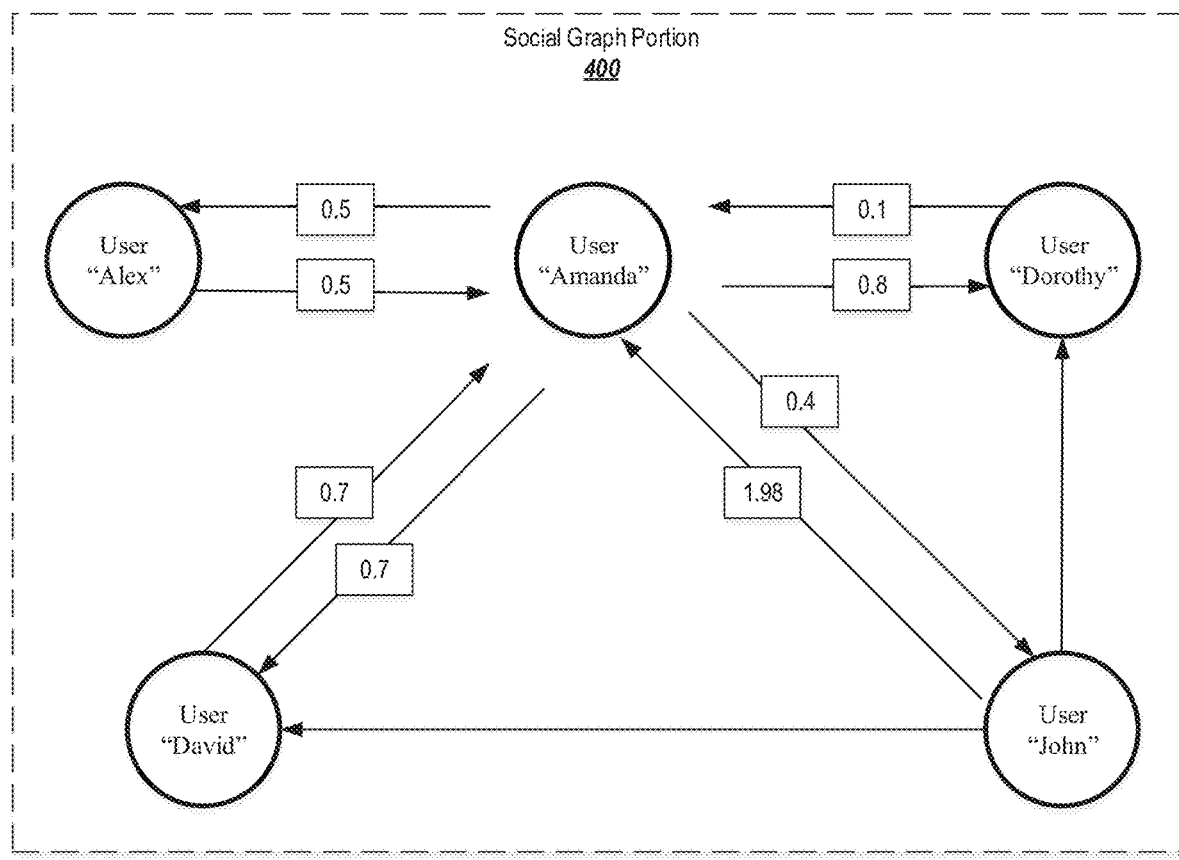
FIG. 4C

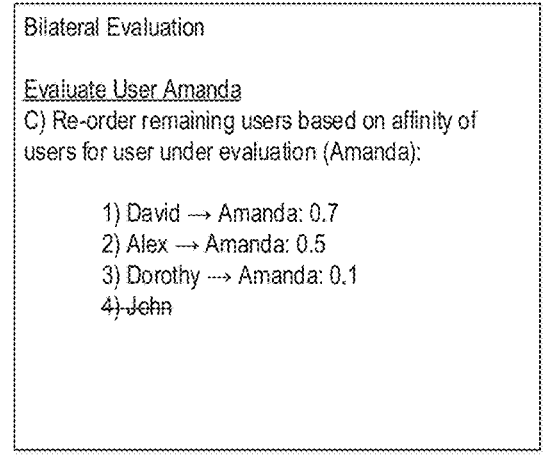
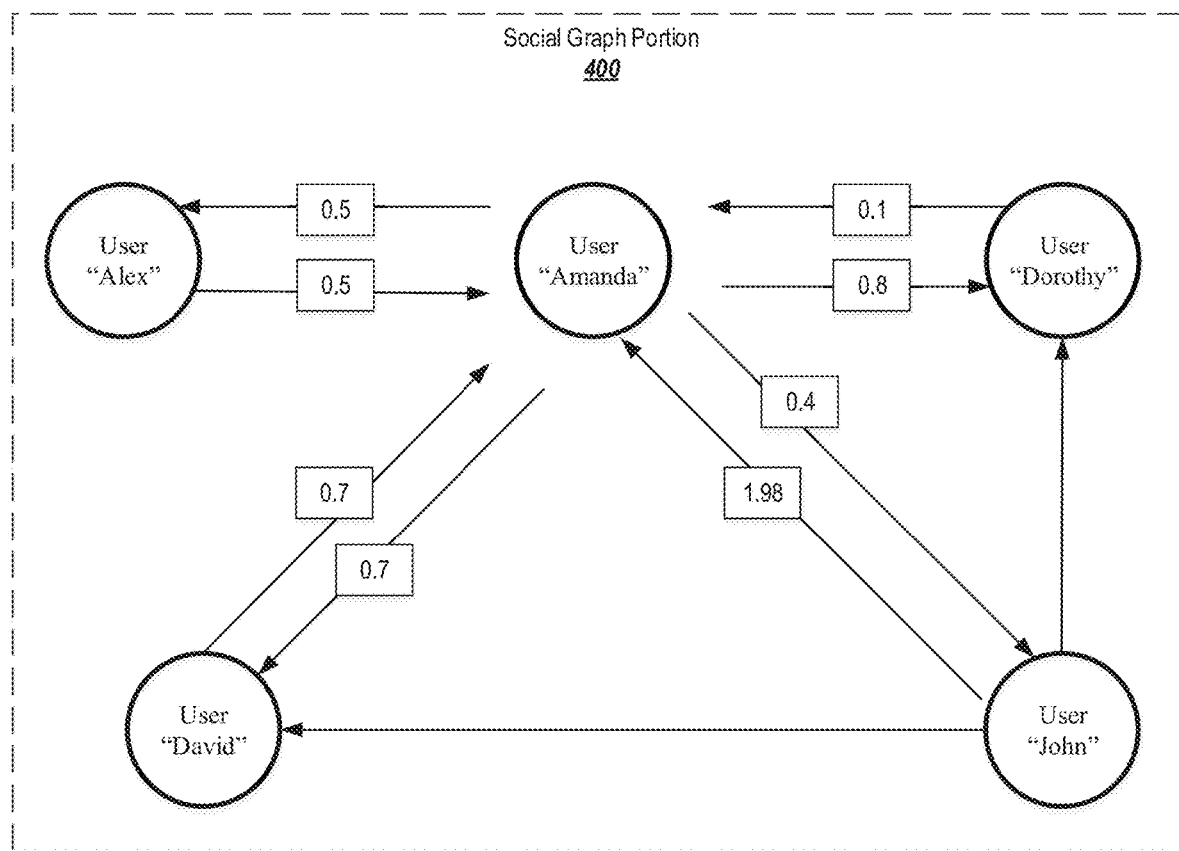
FIG. 4D

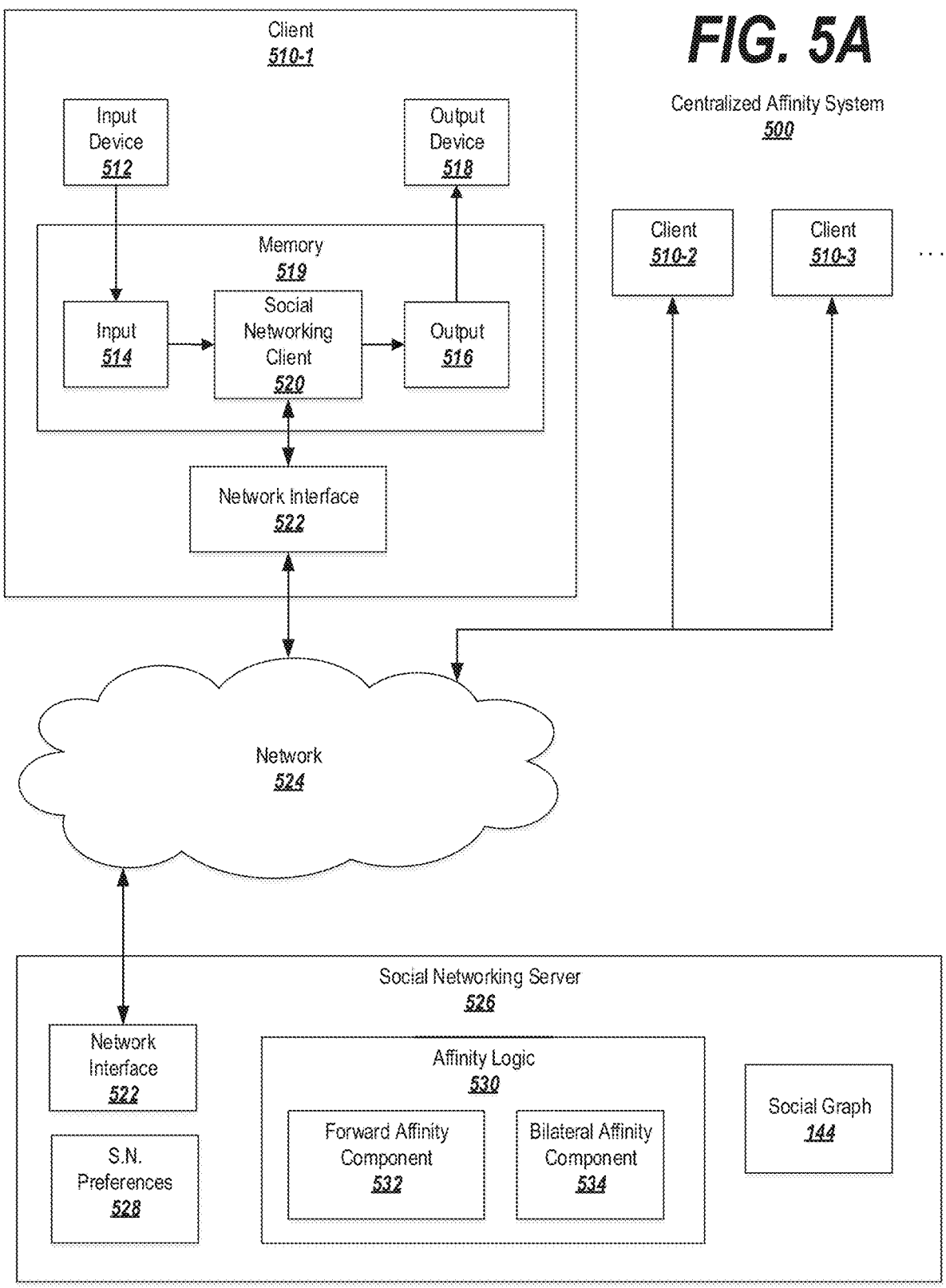

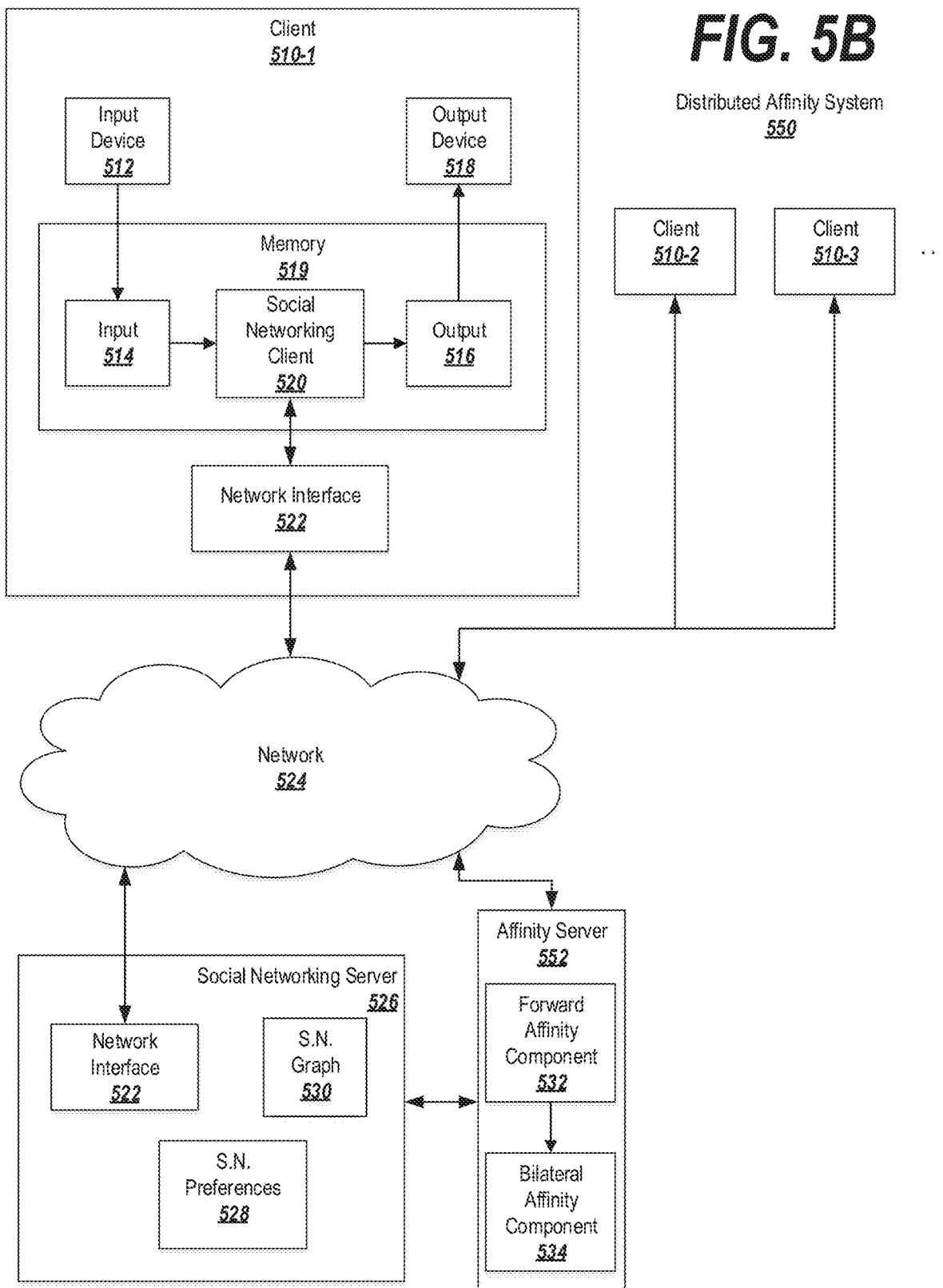

Forward Affinity Logic
600

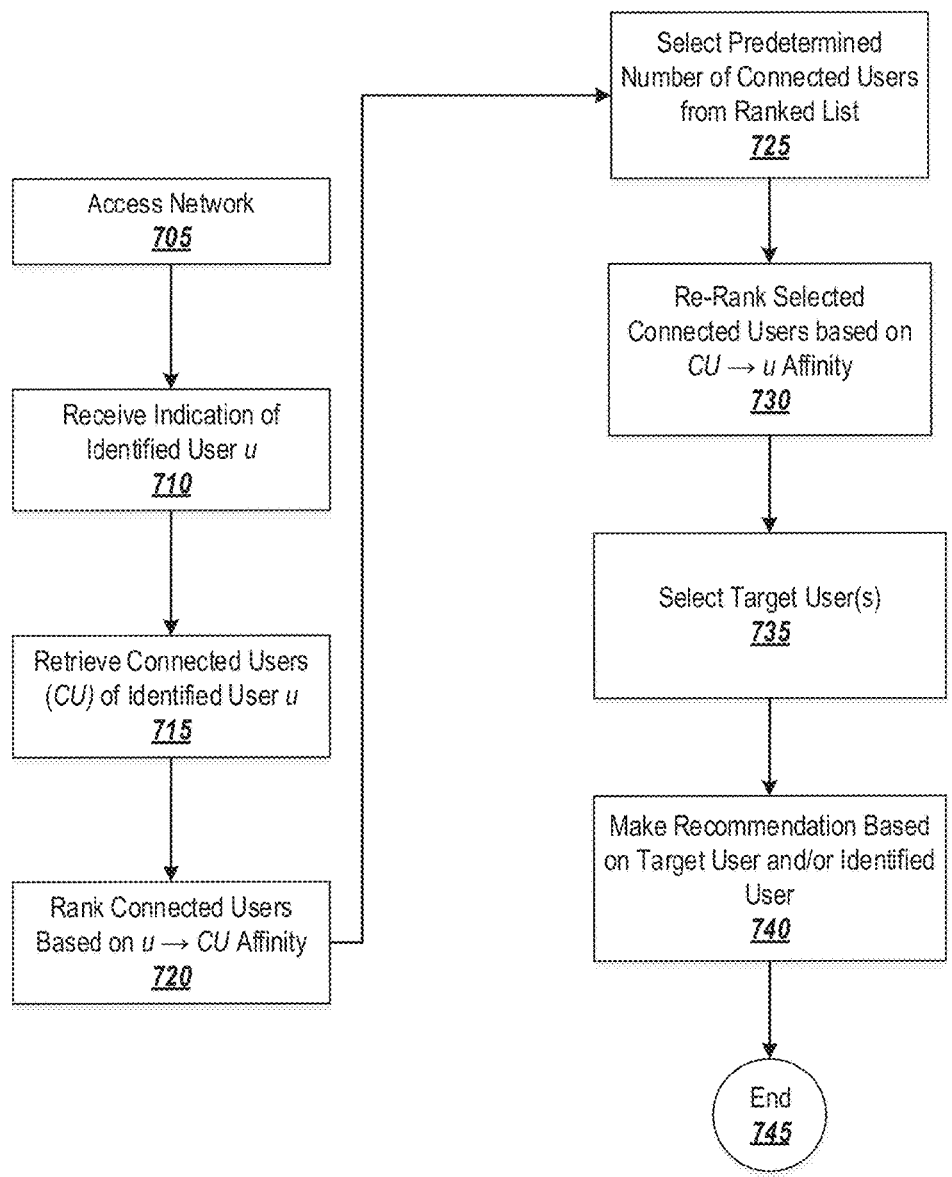

METHODS AND SYSTEMS FOR ASSIGNING AFFINITY SCORES TO CONTACTS

BACKGROUND

In a network that includes multiple users, such as a social network, it may be helpful to determine a degree of affinity or engagement between two or more of the users. Such information might be determined, for example, based on user interactions within the network. However, in some situations, such as when a new user joins a network, information about the user's interactions with other members of the network may be unavailable or extremely limited. Thus, it may be difficult to determine the new user's affinity or engagement with the other users of the network.

SUMMARY

Various embodiments are generally directed to techniques for determining affinity and engagement coefficients that reflect a degree of connectedness, kinship, or similarity between two users in a network. Furthermore, exemplary embodiments may utilize the calculated coefficients for various purposes, such as making recommendations to a first user based on a bilateral affinity between the first user and other users in the network. Other embodiments are also described and claimed.

BRIEF DESCRIPTION OF THE DRAWINGS

Certain illustrative aspects are described in connection with the annexed drawings. These aspects are indicative of the various ways in which the principles disclosed can be practiced and all aspects and equivalents thereof are intended to be within the scope of the claimed subject matter. Other advantages and novel features will be apparent from the following detailed description when considered in conjunction with the drawings.

FIG. 3A depicts an exemplary procedure for requesting a new user's contacts list from a client and providing the contacts list to a social networking server;

FIG. 4B depicts a first step in determining a bilateral affinity between the first user and other users of the network;

FIG. 4C depicts a second step in determining the bilateral affinity between the first user and other users of the network;

FIG. 4D depicts a third step in determining the bilateral affinity between the first user and other users of the network;

FIG. 5A is a block diagram providing an overview of a system including an exemplary centralized affinity service;

FIG. 5B is a block diagram providing an overview of a system including an exemplary distributed affinity service;

FIG. 7 is a flowchart depicting an exemplary process for determining a bilateral affinity between users in a network and making a recommendation regarding a user under evaluation;

DETAILED DESCRIPTION

Figure 1A:
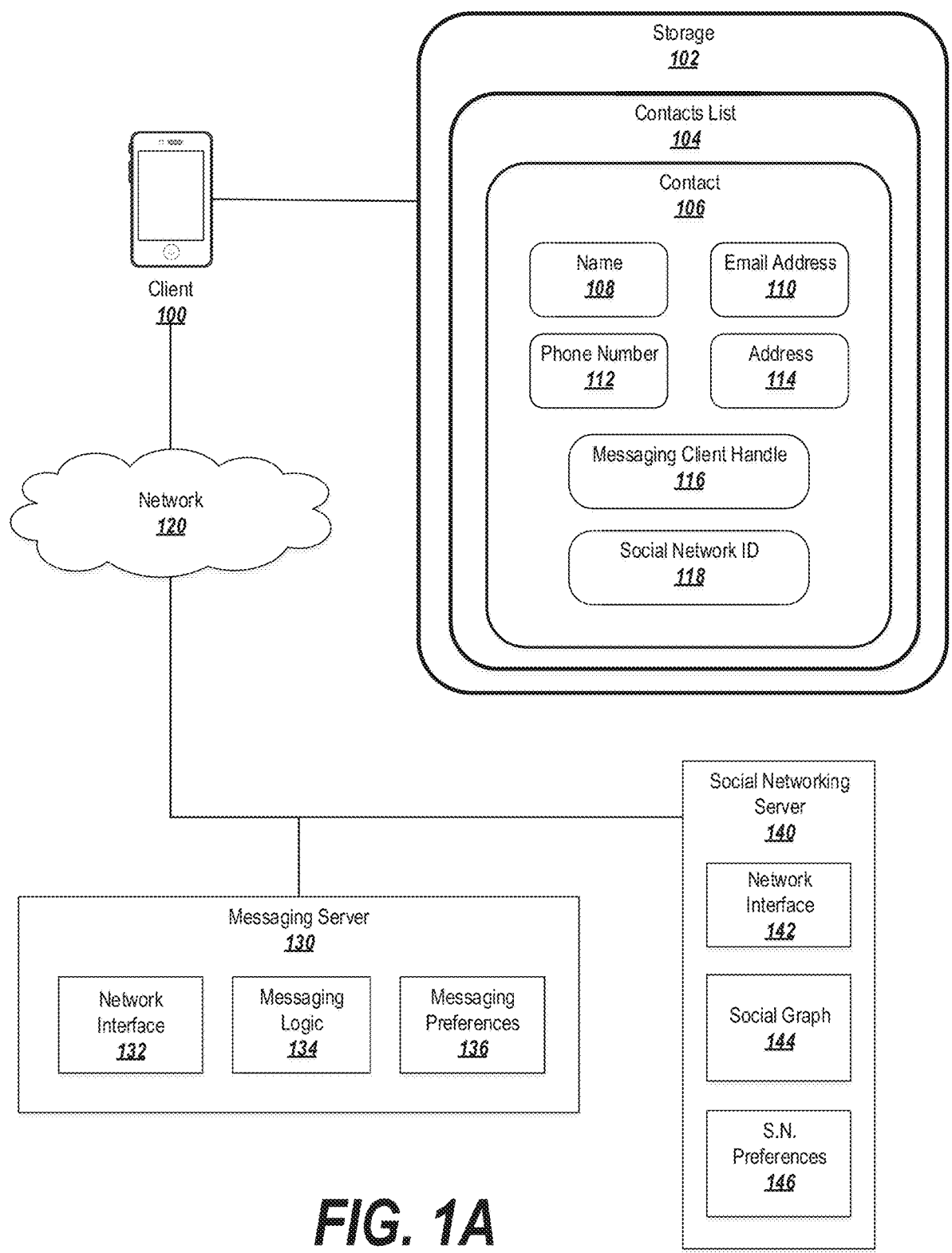
FIG. 1A depicts an exemplary system for connecting a client to a messaging service and/or a social networking service.

Exemplary embodiments described herein pertain to improvements in social networks, and in particular to techniques for determining affinity and engagement coefficients that reflect a degree of connectedness, kinship, or similarity between two users. Furthermore, exemplary embodiments may utilize the calculated coefficients for various purposes, such as making recommendations to a first user based on the likes or dislikes of other users with whom the first user has a high degree of affinity or engagement.

These techniques may be applied in situations when only limited information about a user's affinities are available. (e.g., when a new user joins a social network). Any information that is available for the user, such as the user's telephone contact list or a list of contacts on a messaging service, may be used to determine a group of existing users to which the new user is connected. For each of the existing users, an affinity score may be calculated between that user and the other existing users from the contact list. The affinity scores may be added together, and that sum may be multiplied by a function that moderates a linear increase of the sum (e.g., the square root of the number of existing users connected to the currently-evaluated user, or the inverse of that number, or some other function). The resulting product may be used as the forward affinity for the new user to the evaluated existing user.

In further embodiments, user affinities or engagement scores may be used to select one or more target users for making recommendations concerning a user under evaluation. Each pair of users may have affinities that run in two directions: from a first user to a second user, and from the second user to the first user. Affinities may be evaluated in a bilateral manner, to ensure that the user under evaluation has affinity for the user upon whom the recommendation is based, and also to ensure that the user upon whom the recommendation is based has affinity for the user under evaluation.

In order to accomplish this goal, the contacts of the user under evaluation may be retrieved. The contacts may be ordered based on the affinity of the user under evaluation for each of the contacts. A number n of the contacts at the top of the ordered list may be selected, and the list of n top contacts may then be rearranged based on the affinities of each of the n contacts for the user under evaluation. One or more of the contacts at the top of the rearranged list may be selected for making recommendations to the user under evaluation (or to the selected contacts).

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, . . . , 122-a. The embodiments are not limited in this context.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in connection with any type of network in which users interact. Exemplary embodiments are particularly useful in the context of a social network and/or a messaging system. An overview of an exemplary social network and messaging system is provided in the next section.

System Overview

Various embodiments are generally directed to techniques for determining affinity and engagement coefficients that reflect a degree of connectedness, kinship, or similarity between two users. These techniques may be applied in situations when only limited information about a user's affinities are available. For example, a new user may join a social networking service, having previously participated in a messaging service or having previously developed a contacts list on a mobile device. The list of contacts from the messaging service or the mobile device contacts list may be utilized to establish initial affinities in the social networking service.

FIG. 1A depicts an example of a system in which a user interacts with a messaging system and/or a social networking system using a client 100. The client 100 may be a mobile device, such as a phone, a tablet computer, or a mobile computer, or may be another type of computing device, such as a desktop computer or workstation.

The client 102 may include a storage device 102, such as a hard disk drive (HDD) or solid state drive (SDD), among other possibilities. The storage 102 may store a contacts list 104, such as a general contacts list for the client 100 or a special-purpose contacts list for a particular application available to the client 100 (e.g., a messaging client). The contacts list 104 may contain or reference data structures representing one or more contacts 106. Each contact 106 may contain or reference a number of fields or data values, such as a contact name 108, a contact email address 110, a contact phone number 112, a contact address 114, a contact's messaging client handle 116, and/or a contact's social network ID 118. The data structure for the contact 106 may be manually populated by the user of the client 100, or may be automatically populated with information retrieved from one or more services (e.g., a messaging service), or both.

The client 100 may use a network 120, such as the Internet, to access a messaging server 130 that provides a messaging service and/or to access a social networking server 140 that provides a social networking service.

The messaging server 130 may include a network interface 132 for receiving information from the network 120. The network interface 132 may forward the information to messaging logic 134, which may process the information in view of a user's messaging preferences 136 in order to transmit messages or conversations between two or more users.

The social networking server 140 may also include a network interface 142 for receiving information from the network 120. The information may be used by the social networking server 140 in order to update or maintain a social graph 144 in view of different users' social networking preferences 146. The social networking server 140 may also include functionality to present the information to users of a social network, such as through messages, posts, etc.

Figure 1B:
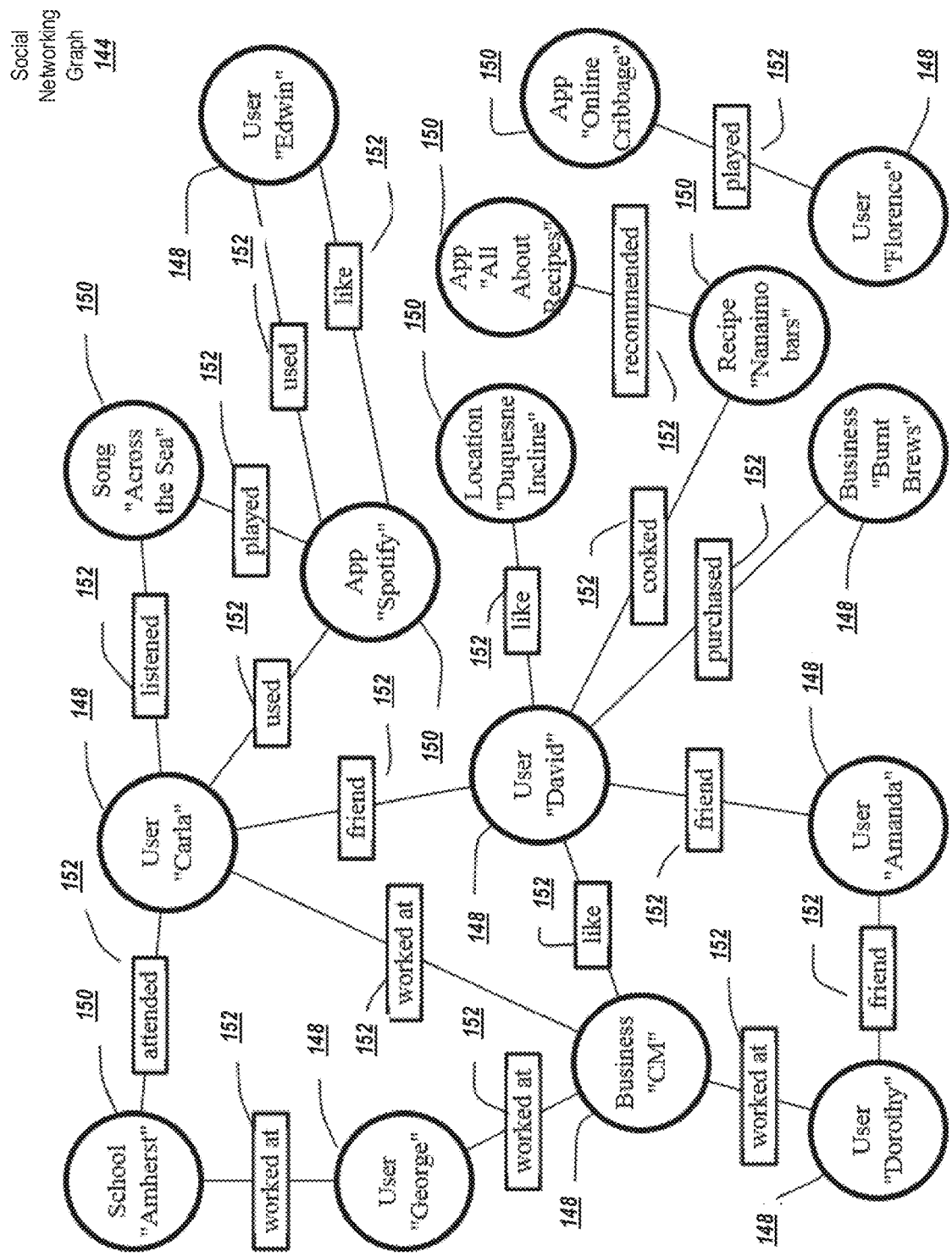
FIG. 1B depicts an exemplary social networking graph.

The social graph 144 may define relationships between entities in the social network. FIG. 1B illustrates an example of a social graph 144 in more detail. In exemplary embodiments, a social networking service may store one or more social graphs 144 in one or more data stores as a social graph data structure via the social networking service.

The social graph 144 may include multiple nodes, such as user nodes 148 and concept nodes 150. The social graph 144 may furthermore include edges 152 connecting the nodes. The nodes and edges of social graph 144 may be stored as data objects, for example, in a data store (such as a social-graph database). Such a data store may include one or more searchable or queryable indexes of nodes or edges of social graph 144.

The social graph 144 may be accessed by a social networking server, a client system, a third-party system, or any other approved system or device for suitable applications.

A user node 148 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 148 corresponding to the user, and store the user node 148 in one or more data stores. Users and user nodes 148 described herein may, where appropriate, refer to registered users and user nodes 148 associated with registered users. In addition or as an alternative, users and user nodes 148 described herein may, where appropriate, refer to users that have not registered with the social-networking system. In particular embodiments, a user node 148 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 148 may be associated with one or more data objects corresponding to information associated with a user. In particular embodiments, a user node 148 may correspond to one or more webpages. A user node 148 may be associated with a unique user identifier for the user in the social-networking system.

In particular embodiments, a concept node 150 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 150 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 150 may be associated with one or more data objects corresponding to information associated with concept node 150. In particular embodiments, a concept node 150 may correspond to one or more webpages.

In particular embodiments, a node in social graph 144 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 150. Profile pages may be viewable by all or a selected subset of other users. As an example and not by way of limitation, a user node 148 may have a corresponding user-profile page in which the corresponding user may add content, make declarations, or otherwise express himself or herself. A business page may comprise a user-profile page for a commerce entity. As another example and not by way of limitation, a concept node 150 may have a corresponding concept-profile page in which one or more users may add content, make declarations, or express themselves, particularly in relation to the concept corresponding to concept node 150.

In particular embodiments, a concept node 150 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 148 corresponding to the user and a concept node 150 corresponding to the third-party webpage or resource and store edge 152 in one or more data stores.

In particular embodiments, a pair of nodes in social graph 144 may be connected to each other by one or more edges 152. An edge 152 connecting a pair of nodes may represent a relationship between the pair of nodes. In particular embodiments, an edge 152 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 152 connecting the first user's user node 148 to the second user's user node 148 in social graph 144 and store edge 152 as social-graph information in one or more data stores. In the example of FIG. 1B, social graph 144 includes an edge 152 indicating a friend relation between user nodes 148 of user "Amanda" and user "Dorothy." Although this disclosure describes or illustrates particular edges 152 with particular attributes connecting particular user nodes 148, this disclosure contemplates any suitable edges 152 with any suitable attributes connecting user nodes 148. As an example and not by way of limitation, an edge 152 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 144 by one or more edges 152.

In particular embodiments, an edge 152 between a user node 148 and a concept node 150 may represent a particular action or activity performed by a user associated with user node 148 toward a concept associated with a concept node 150. As an example and not by way of limitation, as illustrated in FIG. 1B, a user may "like," "attended," "played," "listened," "cooked," "worked at," or "watched" a concept, each of which may correspond to an edge type or subtype. A concept-profile page corresponding to a concept node 150 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 152 and a "used" edge (as illustrated in FIG. 1B) between user nodes 148 corresponding to the user and concept nodes 150 corresponding to the song and application to indicate that the user listened to the song and used the application. Moreover, the social-networking system may create a "played" edge 152 (as illustrated in FIG. 1B) between concept nodes 150 corresponding to the song and the application to indicate that the particular song was played by the particular application. In this case, "played" edge 152 corresponds to an action performed by an external application (SPOTIFY) on an external audio file (the song "Across the Sea"). Although this disclosure describes particular edges 152 with particular attributes connecting user nodes 148 and concept nodes 150, this disclosure contemplates any suitable edges 152 with any suitable attributes connecting user nodes 148 and concept nodes 150. Moreover, although this disclosure describes edges between a user node 148 and a concept node 150 representing a single relationship, this disclosure contemplates edges between a user node 148 and a concept node 150 representing one or more relationships. As an example and not by way of limitation, an edge 152 may represent both that a user likes and has used at a particular concept. Alternatively, another edge 152 may represent each type of relationship (or multiples of a single relationship) between a user node 148 and a concept node 150 (as illustrated in FIG. 1B between user node 148 for user "Edwin" and concept node 150 for "SPOTIFY").

In particular embodiments, the social-networking system may create an edge 152 between a user node 148 and a concept node 150 in social graph 144. As an example and not by way of limitation, a user viewing a concept-profile page (such as, for example, by using a web browser or a special-purpose application hosted by the user's client system) may indicate that he or she likes the concept represented by the concept node 150 by clicking or selecting a "Like" icon, which may cause the user's client system to send to the social-networking system a message indicating the user's liking of the concept associated with the concept-profile page. In response to the message, the social-networking system may create an edge 152 between user node 148 associated with the user and concept node 150, as illustrated by "like" edge 152 between the user and concept node 150. In particular embodiments, the social-networking system may store an edge 152 in one or more data stores. In particular embodiments, an edge 152 may be automatically formed by the social-networking system in response to a particular user action. As an example and not by way of limitation, if a first user uploads a picture, watches a movie, or listens to a song, an edge 152 may be formed between user node 148 corresponding to the first user and concept nodes 150 corresponding to those concepts. Although this disclosure describes forming particular edges 152 in particular manners, this disclosure contemplates forming any suitable edges 152 in any suitable manner.

The social graph 144 may further comprise a plurality of product nodes. Product nodes may represent particular products that may be associated with a particular business. A business may provide a product catalog to a consumer-to-business service and the consumer-to-business service may therefore represent each of the products within the product in the social graph 144 with each product being in a distinct product node. A product node may comprise information relating to the product, such as pricing information, descriptive information, manufacturer information, availability information, and other relevant information. For example, each of the items on a menu for a restaurant may be represented within the social graph 144 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 144. The information for a product node may be manipulated by the social-networking system as a product object that encapsulates information regarding the referenced product.

As such, the social graph 144 may be used to infer shared interests, shared experiences, or other shared or common attributes of two or more users of a social-networking system. For instance, two or more users each having an edge to a common business, product, media item, institution, or other entity represented in the social graph 144 may indicate a shared relationship with that entity, which may be used to suggest customization of a use of a social-networking system, including a messaging system, for one or more users.

Connectedness and Affinity

Figure 1C:
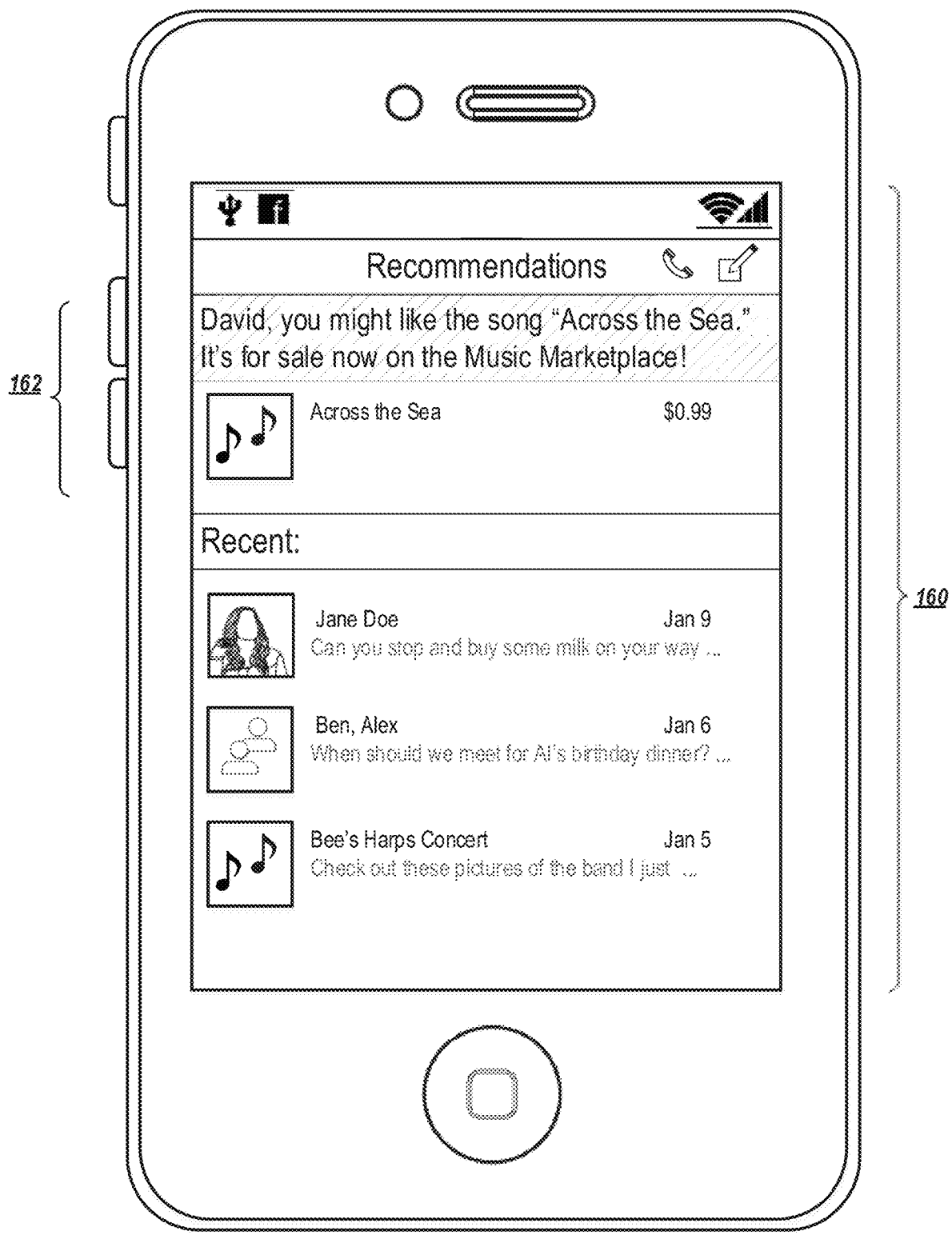
FIG. 1C depicts an exemplary user interface for making a recommendation to a user of a social network.

In some situations, the connections between nodes can be leveraged in order to provide recommendations based on the mutual interests of two users. For example, FIG. 1C shows an exemplary user interface 160 for a social networking application as viewed on a client for the user "David." As shown in FIG. 1B, David is a friend of Carla, and Carla has listened to the song "Across the Sea." Based on the friend connection between David and Carla (as well as other data points), the social networking system may determine that David might also like the song "Across the Sea," and recommends that David purchase the song. Accordingly, the interface 160 of FIG. 1C includes a recommendation frame 162 for presenting promotional banners or other forms of recommendations.

Not all of the possible recommendations may be equally valuable, however. For example, if David is not particularly close to Carla, or does not share many common interests, then a recommendation made to David based on Carla's interests may not be a particularly good fit for David. If David is closer to his friend Amanda, then the social networking system may select better recommendations for David if those recommendations are based on Amanda's likes and dislikes.

Accordingly, connections in a social network may include an affinity score that describes how closely connected two users are. In the above example, David might have a relatively low affinity score for Carla and a relatively high affinity score for Amanda. Affinities may be directional; for example, David's affinity for Carla may be different than Carla's affinity for David. Affinities may be determined for example, based on users' interactions with each other (e.g., sending a message to another user, liking another user's post, posting messages to another user's page, etc.), common interests shared between users, etc.

Thus, a user's connections and affinities may be used to make recommendations based on what other users in the network like or dislike. However, when a new user is added to a social graph 144, the new user typically has no connections to the rest of the social graph 144. Even when connections are made, the social networking system may lack sufficient historical information regarding user interactions in order to establish reliable affinity scores between the new user and any connected users, which can be a problem when it comes to making recommendations for the new user.

Figure 1D:
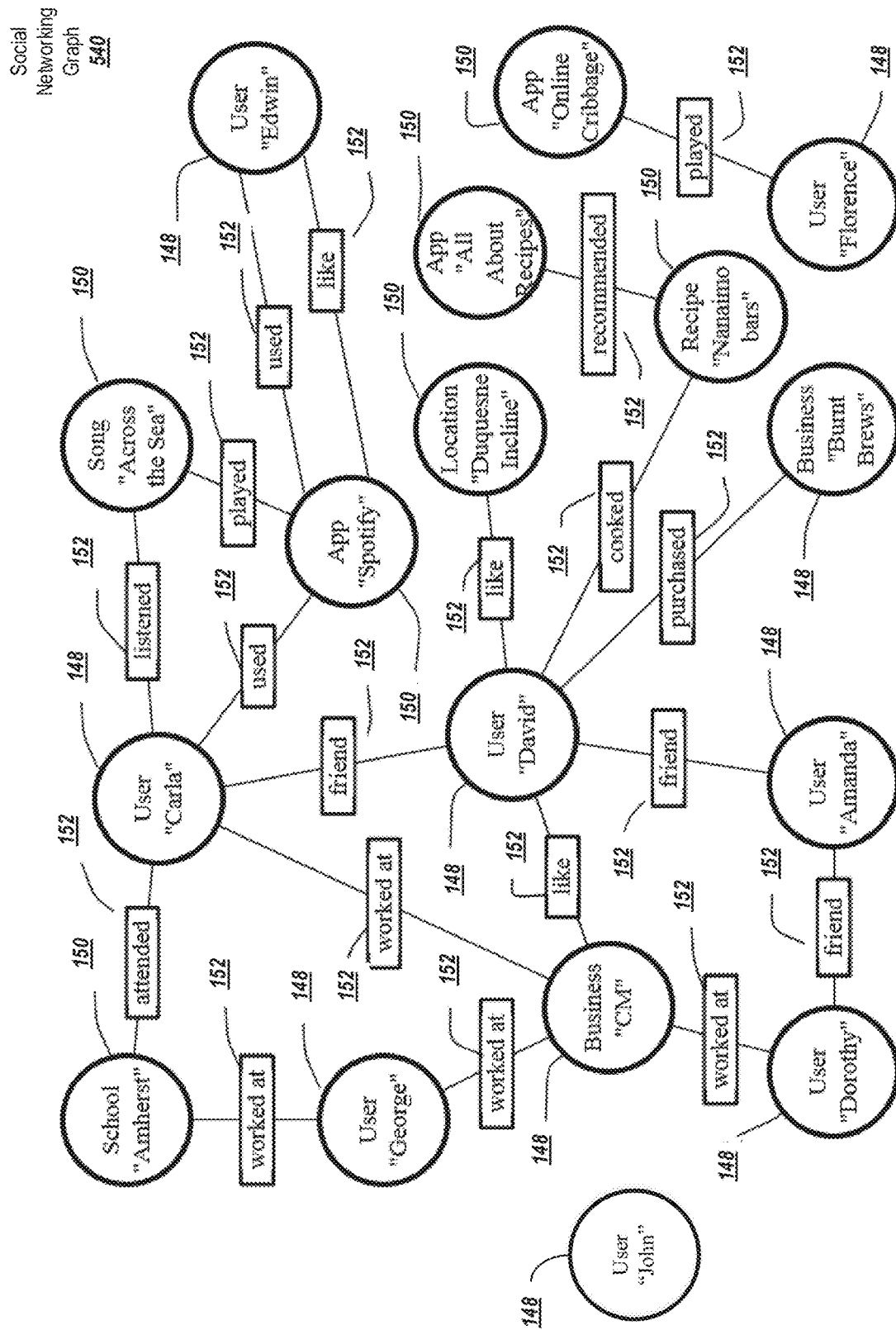
FIG. 1D depicts the addition of a new user to the social networking graph of FIG. 1B.

For example, FIG. 1D depicts a situation in which a user node 148 has been created for a new user "John." In this case, John's user node 148 does not initially include any connections to other nodes in the social graph 144. Once John begins to connect to existing users, the social networking system may gain some insight into users that John associates with; nonetheless, the social networking system will likely not have sufficient information in order to calculate concrete affinities between John and the other users for some time. Therefore, the social networking system may not have enough information to make an informed recommendation to John.

Exemplary embodiments address this problem by calculating a forward coefficient or affinity for the new user (or for an existing user for whom affinity information is lacking). The forward coefficient is calculated based on the group of people to whom that the new user is connected in the network, or to whom a connection can be inferred based on outside information (e.g., the new user's phone contacts lists, or messaging contacts). This group of connected users forms a cohort that is then analyzed to determine the extent to which members of the cohort are connected to each other. Users with high degrees of interconnectedness in the cohort are assigned a higher affinity in connection with the new user, while users with low degrees of interconnectedness in the cohort are assigned lower affinities in connection with the new user. This affinity determination is based on the presumption that a person who is a friend to a large number of the new user's friends is likely to be close to, and therefore have a relatively high affinity to, the new user.

In addition to promotional materials, the recommendation interface may also be used to encourage users to participate in the social network or messaging service. U.S. patent application Ser. No. 14/964,232, filed on Dec. 9, 2015 and entitled "Predicting and Facilitating Increased Use of a Messaging Application," describes the calculation of a score that identifies which users of a messaging system are likely to be highly active, and which are not. Identifying users that are, or are likely to become, inactive may be helpful to the administrators of a social network, because it allows the administrators to take action to encourage the potentially inactive user to become more engaged before the user leaves the network.

Figure 2A:
FIG. 2A depicts another example of a user interface for making a second type of recommendation to a user of a social network.

In order to encourage a potentially inactive user to become more active, the social networking service may recommend that one of the user's friends send a message to the user, as shown in the recommendation frame 162 of FIG. 2A. In this case, the system has identified that the user Amanda is at risk of becoming inactive, and is recommending that the user David send a message to Amanda. If David sends a message to Amanda, this makes it more likely that Amanda will become re-engaged with the social networking service.

Figure 2B:
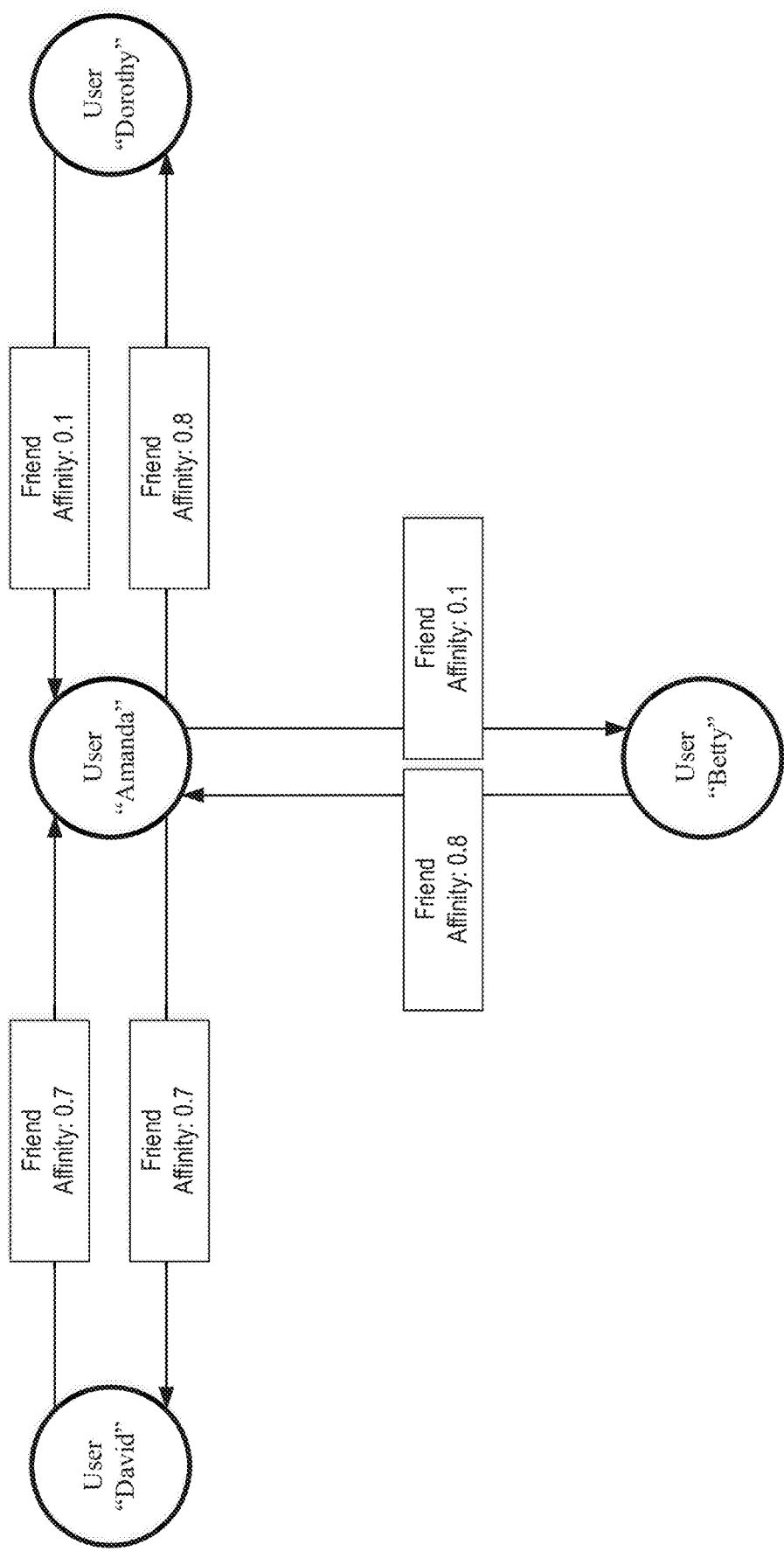
FIG. 2B depicts exemplary affinities in a social networking graph.

However, another problem may arise in this context. Once the user that is at risk of becoming inactive is identified (Amanda, in the above example), a suitable candidate must still be selected in order to message Amanda. FIG. 2B shows a portion of Amanda's social graph, including affinities between users connected to Amanda. In this case, Amanda has a relatively high affinity (0.8) for the user Dorothy, and thus would be likely to respond and re-engage in the social networking service if she received a message from Dorothy. Thus, one possibility is to recommend to Dorothy that Dorothy send a message to Amanda.

However, as shown in FIG. 2B, Amanda's affinity for Dorothy is not mutual: Dorothy has a relatively low affinity (0.1) for Amanda. Thus, if the social networking system recommends that Dorothy contact Amanda, Dorothy is unlikely to actually send the message.

Accordingly, the social networking system may consider recommending that Betty contact Amanda. Betty has a relatively high affinity (0.8) for Amanda, and thus would be likely to respond to such a request. However, once again the affinity is not mutual: Amanda has a relatively low affinity (0.1) for Betty. Thus, even if Betty sends a message to Amanda, Amanda is unlikely to be interested in receiving such a message and is therefore unlikely to respond and re-engage with the social networking service.

A better recommendation in this case would be to suggest that David send a message to Amanda. Although David's affinity for Amanda (0.7) is not as high as Betty's affinity for Amanda (0.8), and although Amanda's affinity for David (0.7) is not as high as Amanda's affinity for Dorothy (0.8), the affinity among this pair is mutual (i.e., both have relatively high affinities for each other). Thus, David is likely to respond to a recommendation that he contact Amanda, and Amanda is likely to reply to David's message and re-engage in the social networking service.

Recognizing and leveraging mutual affinities may be achieved by calculating bilateral affinity scores or rankings. Exemplary embodiments recognize mutual affinities by first selecting a group of users, each of whom is relatively well-liked (e.g., has a relatively high affinity score) by a user under evaluation. From this group, a user having a relatively high affinity for the user under consideration is selected. This double-ranking procedure ensures that a recommendation is made based on mutual, shared affinity.

In order to make these determinations more concrete, specific examples in which a forward affinity coefficient and a bilateral affinity ranking are calculated are next described in connection with FIGS. 3A-3F (forward affinity coefficient) and FIGS. 4A-4D (bilateral affinity ranking). Following these examples, a more general description of a forward affinity algorithm will be provided in connection with FIG. 7, and a more general description of a bilateral affinity algorithm will be provided in connection with FIG. 8.

In the following embodiments, examples are provided in which a new user joins or returns to a social network. However, one of ordinary skill will recognize that forward and bilateral affinities may be calculated in other situations as well, such as when a new user joins or returns to a messaging service or any other type of network including multiple interacting users. For example, the messaging service may maintain coefficients or affinities for its members, and a new user's list of contacts may be leveraged to calculate affinities for the new user in the messaging service.

Forward Coefficient Example

Figure 3B:
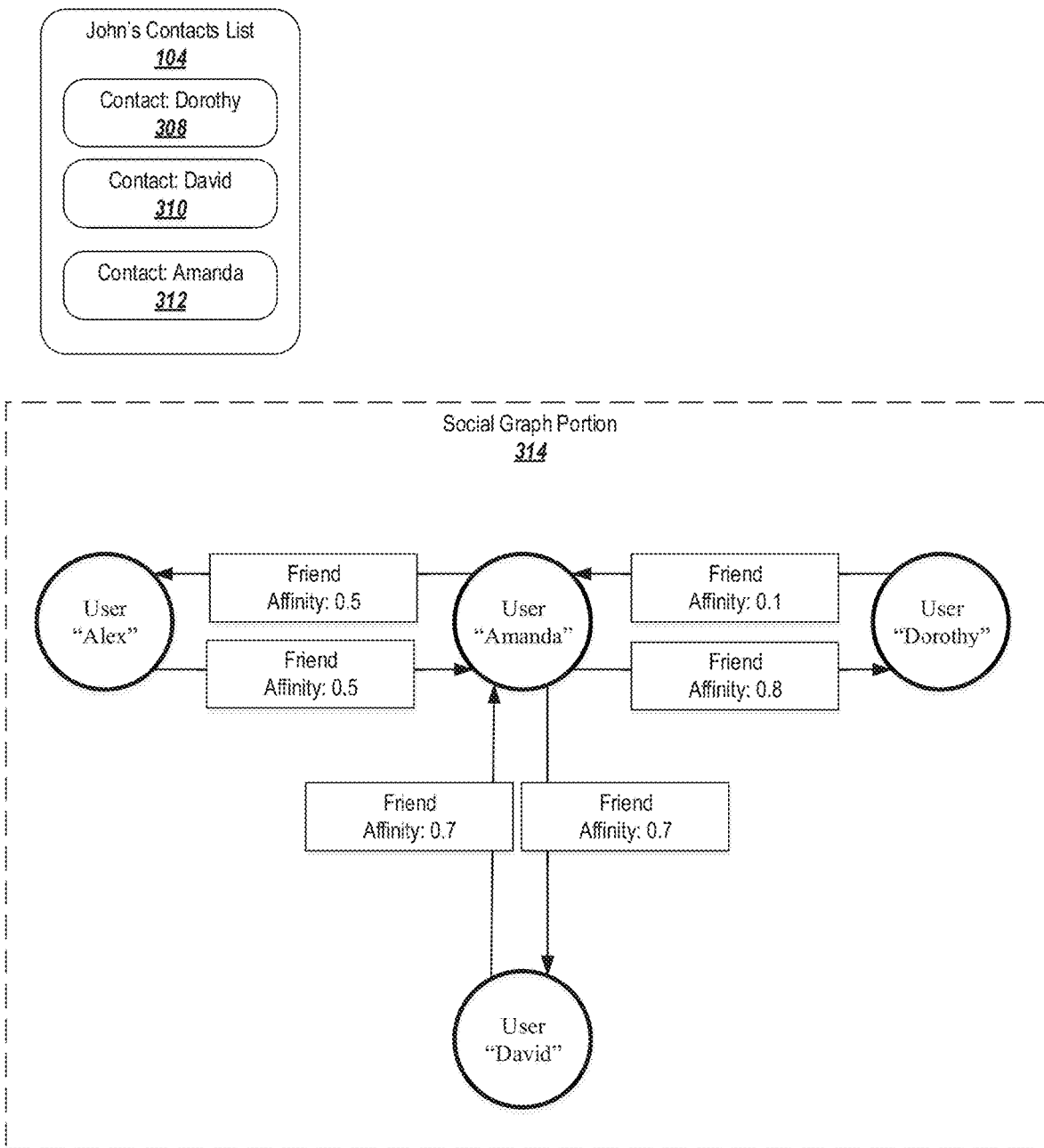
FIG. 3B depicts an example of a portion of a social graph that is evaluated in light of the new user's retrieved contacts.

FIGS. 3A-3F depict an example in which a forward affinity coefficient is calculated for a new user ("John") who joins a social networking service. As shown in FIG. 3A, John interacts with a social networking server 140 though a client 300, such as a mobile phone, tablet, or computer. The client 300 includes a network interface 302 (such as a network interface card or wireless transmitter/receiver) for communicating over a network (not shown). The client 300 further includes a social networking application 304 that communicates with the social networking server 140, an operating system 306 that provides basic functionality of the client 300, and a storage 102 for storing information and applications. In this case, the storage 102 stores a contacts list 104, which includes entries 308, 310, 312 for Amanda, David, and Dorothy, respectively. The contacts list 104 may be a contacts list for the client 300, or may be a dedicated contacts list for an application running on the client (such as for a messaging service).

At step A, John submits a request through the social networking application 304 to join the social networking service. The request is forwarded to the network interface 302 and sent over the network to the social networking server 140 (step B).

At step C, the social networking server 140 acknowledges the request and sends a follow-up asking the client 300 to provide the user's contacts list, if one is available. At step D, the network interface 302 recognizes the request as being designated for the social networking application 304 and forwards the request accordingly. At step E, the social networking application 304 processes the request and identifies that a contacts list 104 exists in the storage 102. The social networking application 304 therefore makes an application program interface (API) call to the operating system 306, requesting that the operating system 306 return the contacts list 104 to the social networking application 304. In one embodiment, the client 300 displays a message indicating that access to the user's contacts list 104 has been requested, and prompts the user to allow or disallow access.

If the user disallows access, then the client 300 reports a failure to the social networking server 140 and the contacts list 104 is not accessed.

If the user allows access, then at step F, the operating system 306 reads the contacts list 104 from the storage 102 in response to the API call. At step G, the operating system 306 returns the contacts list 104 to the social networking application 304.

Having retrieved the contacts list 104, the social networking application 304 prepares a message to the social networking server 140 including the contacts list 104. The message is sent to the network interface 302 at step H, and forwarded to the social networking server 140 at step I.

The social networking server 140 now has access to the contacts list 104 of the new user. The social networking server 140 also maintains or has access to the social graph of the social networking service, a portion 314 of which is shown in FIG. 3B.

The social networking service may analyze the contacts in the contacts list 104 to determine if any of the contacts correspond to existing users of the social networking service. For example, the social networking service may analyze various contact fields, such as the contact name, phone number, email address, messaging handle, etc. in order to determine if a match (a user having the same identifying information) already exists in the social network. The social networking service may then either automatically create a link between the new user and the existing users corresponding to the contacts list, or may recommend that the new user initiate the process for creating the link themselves.

In this example, the users Dorothy, David, and Amanda are present in the new user's contacts list 104, and are also present in the social graph. Another user, Alex, is connected to Amanda but is not present in the new user's contacts list 104. Alex, Amanda, Dorothy, and David are interconnected to varying degrees and have different affinities already established for each other in the social graph portion 314.

The social networking service does not know John's affinity for the existing users. Nonetheless, their affinities for each other may be leveraged to approximate an initial affinity from John to the existing users, based on the assumption that a person who is highly connected within John's group of friends (i.e., a person who is good friends with many of John's friends) is likely also a relatively close friend of John's.

Figure 3C:
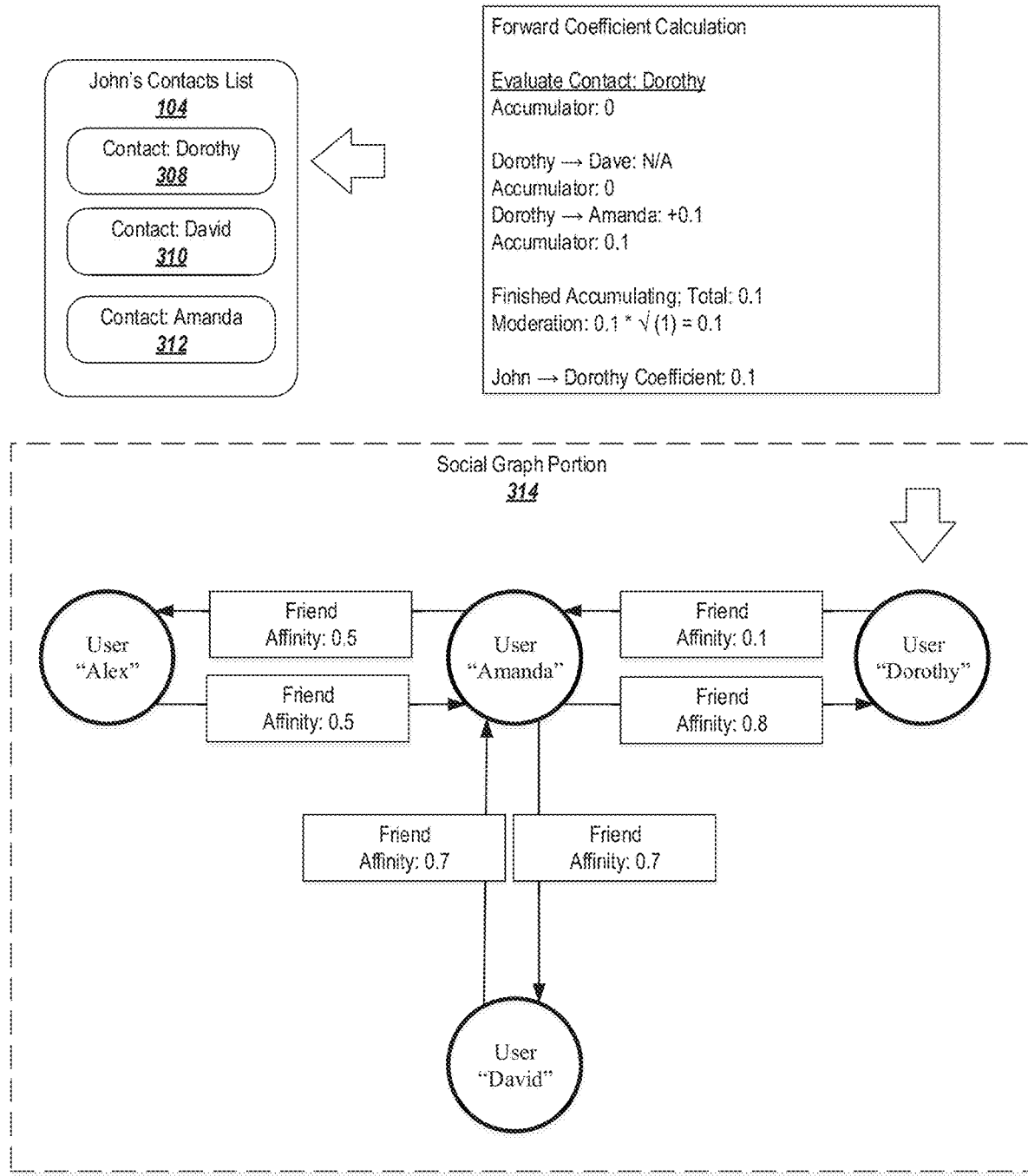
FIG. 3C depicts an example of calculating an affinity between the new user and a first existing user.

Thus, for each user in John's contacts list 104, a forward affinity is calculated. FIG. 3C depicts the calculation of such a forward affinity for Dorothy. Briefly, the affinity from John to Dorothy is approximated by adding together the affinities from Dorothy to each other member of John's contacts list 104. The linear increase of this sum is moderated by multiplying the sum by a function, such as a square root or an inverse, of the number of John's contacts to which Dorothy is connected. This moderated value represents the affinity from John to Dorothy.

More specifically, as shown in the upper-right box of FIG. 3C, an accumulator is initially set to zero. The accumulator accumulates the affinities of the user under evaluation (Dorothy) for other users in the contacts list (Dave and Amanda). Because Dorothy is not connected to Dave in the social graph portion 314, the accumulator does not accumulate any value for a Dorothy→Dave connection. On the other hand, Dorothy is friends with Amanda. Because Dorothy has an affinity of 0.1 for Amanda, the accumulator accumulates a value of 0.1. This value is moderated by multiplying the accumulator by a square root of the number of other contacts to which Dorothy is connected (1, in this case), resulting in a John→Dorothy affinity value of 0.1.

This relatively low affinity value makes intuitive sense in view of the connections present in the social graph portion 314. Dorothy is only loosely connected to John's other friends (befriending only Amanda), and she has a relatively low affinity (0.1) for this sole connection to John's friend group. Thus, it is expected that John is probably not particularly close to Dorothy (otherwise, it would be expected that Dorothy would be more integrated into John's friend group).

Figure 3D:
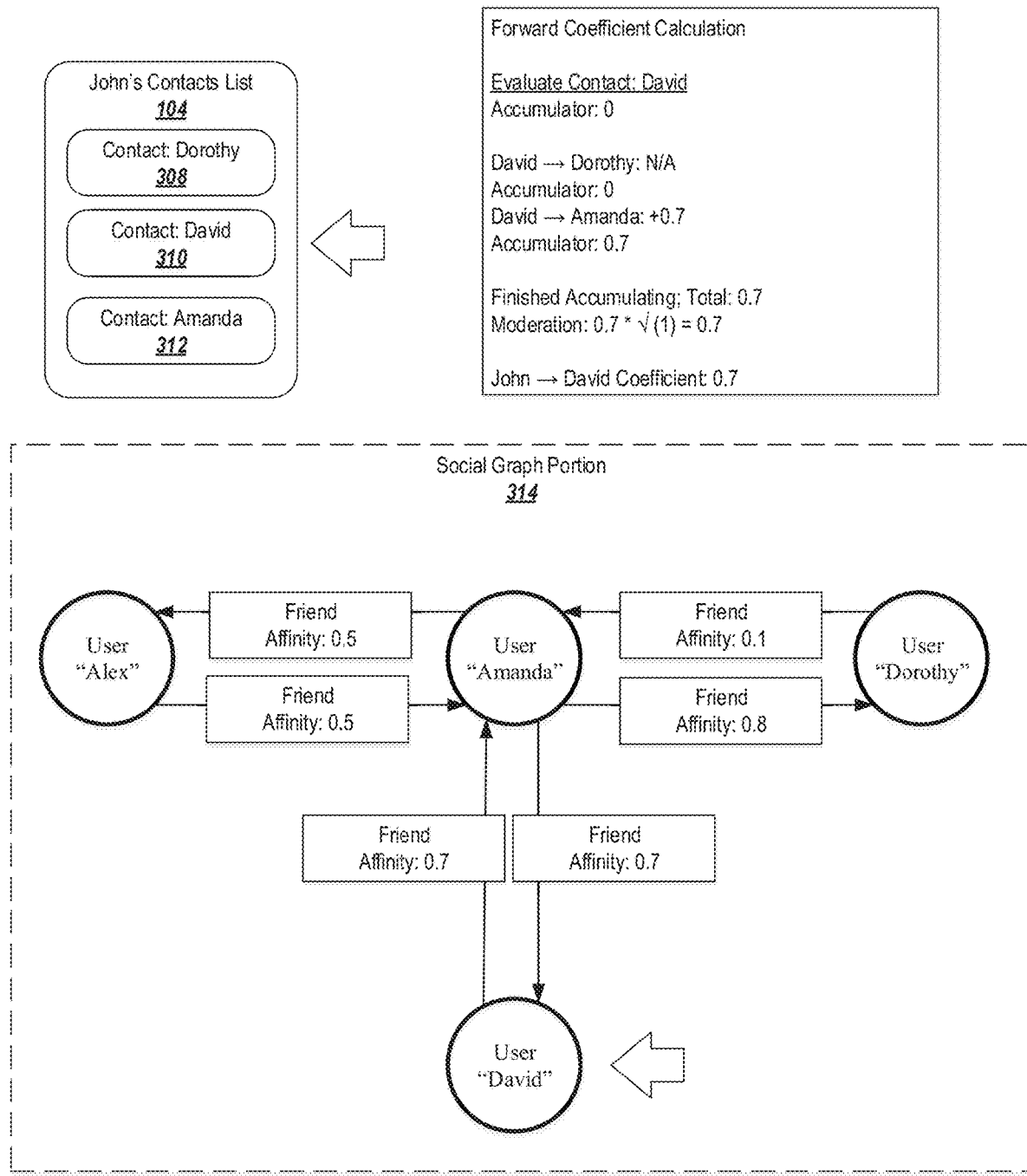
FIG. 3D depicts an example of calculating an affinity between the new user and a second existing user.

A similar calculation for David, shown in FIG. 3D, results in a John→David affinity value of 0.7. In this case, David is also only connected to one other member of John's friend group (Amanda). However, David values this friendship to a greater degree than Dorothy (having an affinity score of 0.7 rather than Dorothy's 0.1), so it is expected that David is better integrated into John's friend group than Dorothy.

Figure 3E:
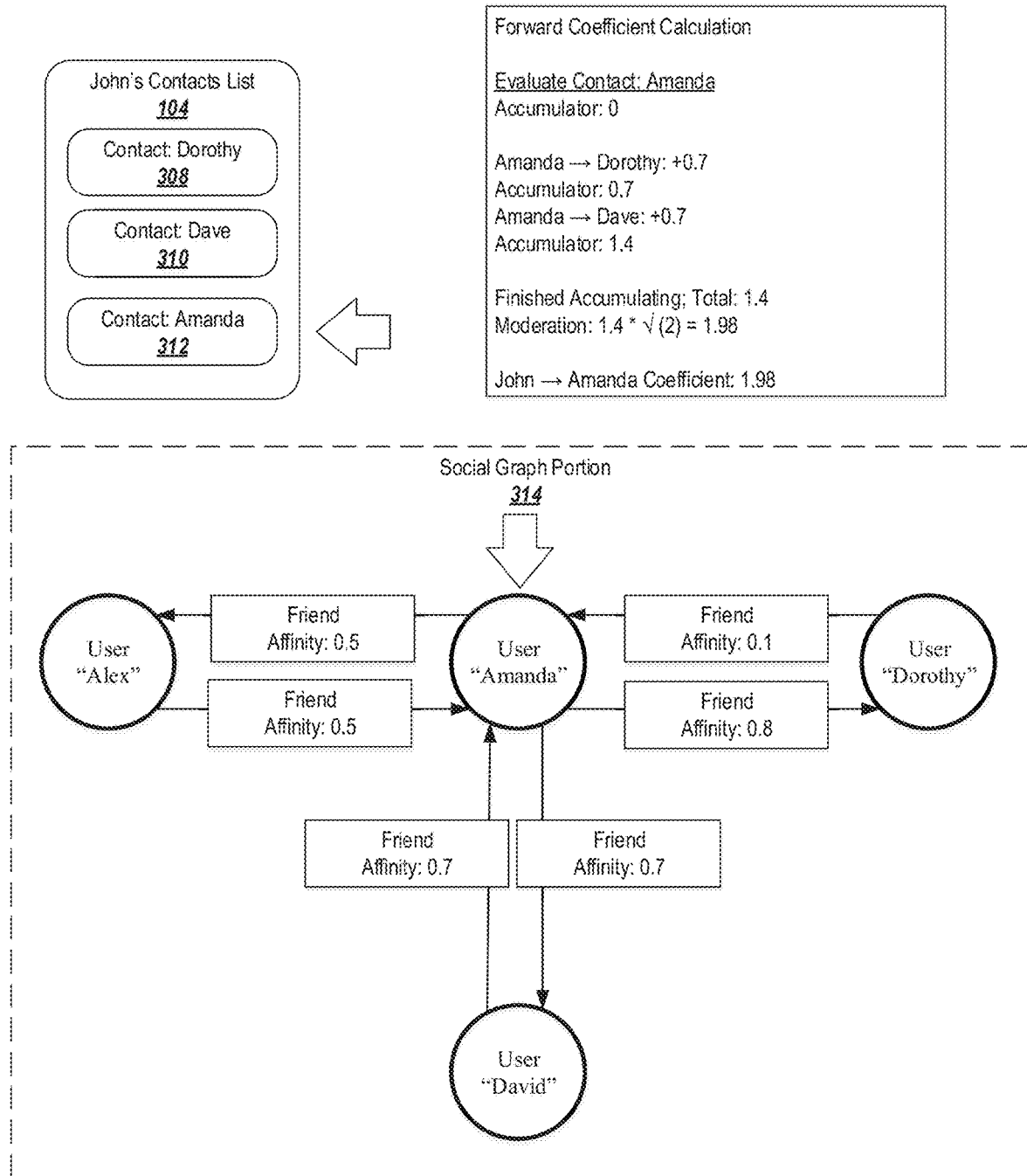
FIG. 3E depicts an example of calculating an affinity between the new user and a third existing user.

As shown in FIG. 3E, Amanda is better connected to John's friend group than either Dorothy or David. Applying the same calculation as before, Amanda's accumulator accumulates a value of 1.4 (0.7 for her friendship with Dorothy, and 0.7 for her friendship with David). This value is moderated by multiplying the accumulator by the square root of 2 (1 for her connection to Dorothy and 1 for her connection to David), resulting in a John→Amanda affinity value of 1.98.

Although Amanda is also friends with Alex in this example, Amanda's affinity for Alex does not play any part in the calculations for John's forward affinity. This is due to the fact that Alex was not part of John's contacts list, and therefore does not form part of the cohort under consideration.

Figure 3F:
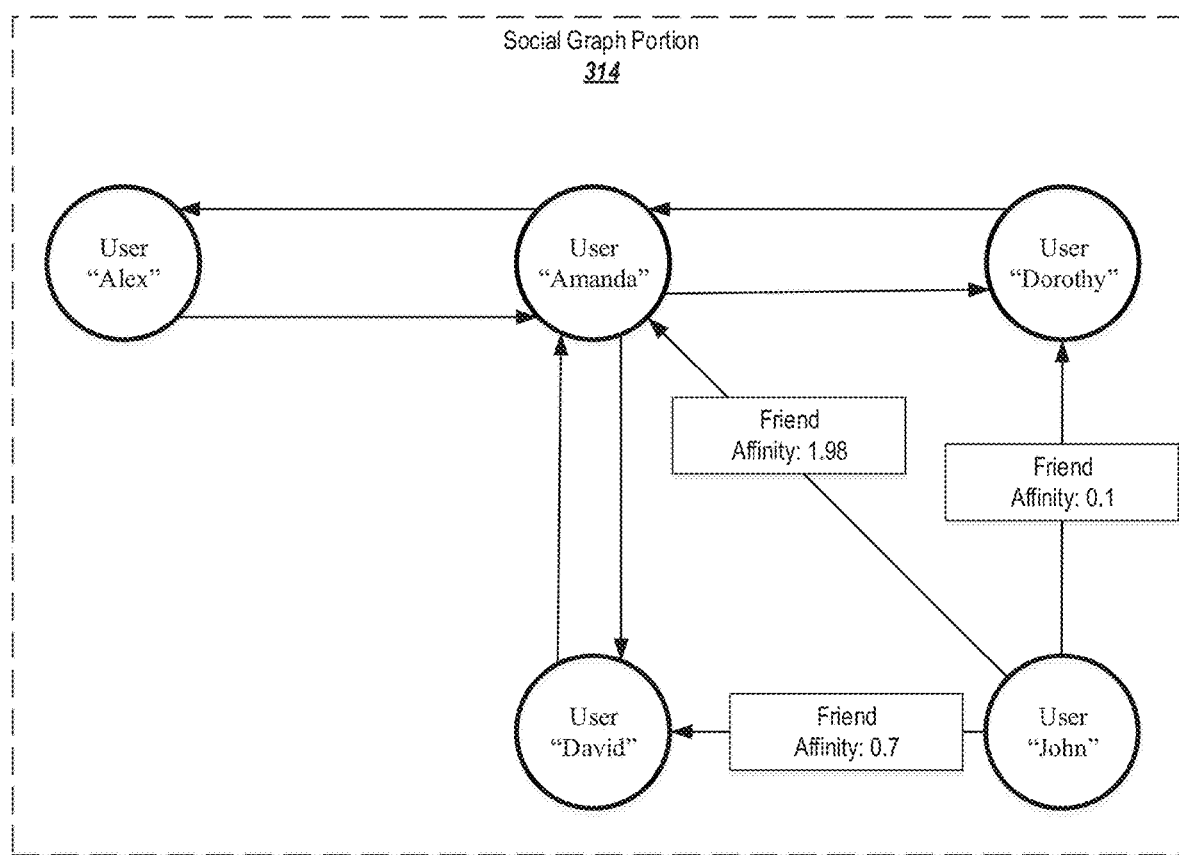
FIG. 3F depicts an example of an updated portion of the social networking graph using the affinities calculated in FIGS. 3C-3E.

Once these forward affinities are calculated, the social graph may be updated with a new node for the new user (John), and may include links with affinities based on the calculations. FIG. 3F shows an update to the social graph portion 314 with John's forward affinities in place.

It is noted that, although the above-described process was only applied to determine forward affinities for John in this example (i.e., affinities from John to the other users in John's friend group), similar calculations could be performed on the updated social graph portion 314 in order to determine initial affinities from each of the existing users back to John (i.e., by analyzing John's degree of interconnectedness with the friend groups of the existing users).

Exemplary pseudocode for calculating a forward affinity coefficient and updating a social graph based on the coefficient is presented below. The following represents but one particular implementation, and is presented for the purposes of explanation and clarification. Consequently, the below pseudocode is not intended to limit the present disclosure. One of ordinary skill in the art will recognize that numerous variations and permutations of the following may be applied.

Pseudocode:

```
input: a Social Network Graph G having a set of nodes N and a set of links L between the nodes,
       where each link l ∈ L specifies: a pair of nodes (n₁ ∈ N, n₂ ∈ N), an affinity score a n1→n2
       representing the affinity of n₁ for n₂, and an affinity score a n2→n1 representing the affinity
       of n₂ for n₁; and
       an Identified User u associated with a Contacts List C, where each contact cᵢ ∈ C may or
       may not correspond to some node nᵢ ∈ N.
output: a modified Social Network Graph G' having a new node nᵤ corresponding to the
       Identified User u, with a set of new links between the new node nᵤ and a set of m existing
       nodes EN from the Graph G that correspond to contacts in the Contacts List C ( EN = {
       n_c1, n_c2, ... , n_cm} ), where each new link l_(nu, nci) has an affinity value in the direction from
       the new node nᵤ to each node nᵢ ∈ EN (i.e., l_(nu, nci).a nu→nci is defined).
// Initialize the new graph and add a new node for the identified user:
graph G' = G;
G'.addnode(nᵤ);
// Retrieve u's contacts list
contact C[ ] = u.contacts_list;
// Initialize an empty list of nodes and an accumulator:
node EN[ ] = null;
int accumulator = 0;
// Find all the nodes in the graph G that have a corresponding contact in C:
for each contact c in C[ ]:
    if (∃ a node n ∈ G corresponding to c), then add n to EN;
// Let m be the number of contacts for which existing nodes were found in G:
int m = EN.size;
// Initialize a variable to store the number of nodes connected to a node under evaluation:
int num_nodes = 0;
// For each node nᵢ in EN, add together the affinities from nᵢ to all other nodes nⱼ in EN that are
linked to nᵢ, while keeping track of the number of connected nodes:
for (int i = 0; i < m; i++):
    {
    for (int j = 0; j < m; j++):
        { if (∃ a link l between EN[i] and EN[j]), then:
                accumulator += l_(ni, nj).a ni→nj and num_nodes++;}
    // Moderate the increase of the accumulator using a square root function:
    accumulator = accumulator * sqrt(num_nodes);
    // Add a link to G' connecting the new node nᵤ and the node under evaluation nᵢ:
    G'.addlink(l_(nu, ni));
    // Set the affinity value for the link between the new user and evaluated node nᵢ to the
    moderated accumulator value:
    l_(nu,ni).a_nu→ni = accumulator;
    // Reset the accumulator and num_nodes for the next node nᵢ:
    accumulator = 0;
    num_nodes = 0;
    }
return G';
```

Bilateral Coefficient Example

FIGS. 4A-4D depict an example in which bilateral coefficients are utilized to make a recommendation concerning a user under evaluation (in this case, the user "Amanda"). The recommendation may be, for example, a recommendation that one of Amanda's friends contact Amanda (e.g., because Amanda has been identified as being at risk of becoming inactive, as discussed above), or a recommendation that Amanda take part in a promotion or other opportunity based on the likes or dislikes of one or more of her contacts.

Figure 4A:
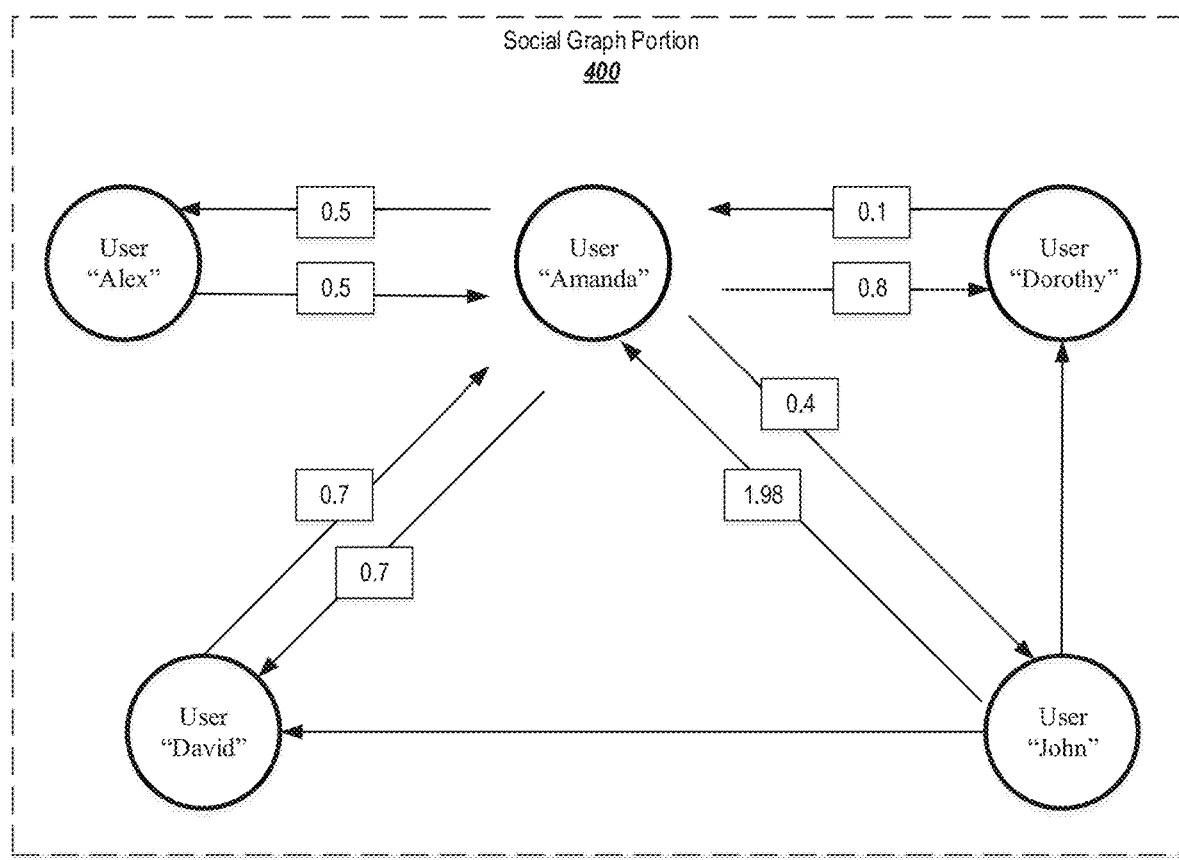
FIG. 4A depicts an example of portion of a social networking graph used to make a recommendation concerning a first user in a network.

As shown in FIG. 4A, a social graph portion 400 indicates that Amanda is connected to four users: Alex, Dorothy, David, and John. In this example, one of these users will be selected as a target user for making a recommendation concerning the user under evaluation (Amanda).

In order to select the target user, a list of Amanda's contacts within the social graph portion 400 is generated, as shown in FIG. 4B. The list is ranked in descending order based on the affinity of the user under evaluation for each of the contacts within the social graph portion 400. In this case, the list is ordered Dorothy, David, Alex, John, because Amanda has the most affinity for Dorothy and the least affinity for John, as shown in the link weights of the social graph portion 400.

After the contacts list is sorted, a predetermined number (n) of the highest-rated contacts are maintained for consideration; the other users in the list may be eliminated from consideration. For example, FIG. 4C depicts a situation in which the three highest-rated users are selected (n=3), while the fourth user is not considered further. This eliminates John from consideration and maintains Dorothy, David, and Amanda.

The procedure shown in FIGS. 4B and 4C may be carried out in other ways, as well. For example, it is not necessary to sort a list of the contacts of the user under evaluation. In another embodiment, an array of size n could be created and could store the top n highest-affinity users connected to Amanda as the social graph portion 400 is traversed. Alternatively or in addition, the lowest-ranked users may be eliminated from consideration until only n users are left. Still further, as the social graph portion 400 is traversed, the $n^{th}$ highest-affinity user may be tracked, and only users having affinity greater-than or equal-to this user may be considered in further steps. Other alternatives will also be apparent to one of ordinary skill in the art.

The filtered list may then be rearranged in descending order based on the affinity of the contacts in the list for the user under evaluation, as shown in FIG. 4D. This is the opposite of the criteria utilized in the ranking in FIG. 4B—if the affinity in FIG. 4B represents affinity in the forward direction (evaluated user→contacts), the criteria in FIG. 4D represents affinity in the backward direction (contacts→evaluated user). The goal of the ranking in FIG. 4B is to ensure that the user under evaluation will value a recommendation coming from the selected contact, whereas the goal of the re-ranking in FIG. 4l) is to ensure that the affinity is mutual.

Once the filtered list is re-ranked as shown in FIG. 4D, one or more users from the top of the re-ranked list may be selected as the target users. For example, if the system is attempting to select a single user in order to suggest that the user message Amanda, then based on the re-ranked list of FIG. 4D, the system may select David to send a message to Amanda.

Exemplary pseudocode for evaluating bilateral affinity coefficients is presented below. The following represents but one particular implementation, and is presented for the purposes of explanation and clarification. Consequently, the below pseudocode is not intended to limit the disclosure. One of ordinary skill in the art will recognize that numerous variations and permutations of the following may be applied.

Pseudocode:

```
input: a Social Network Graph G having a set of nodes N and a set of
       links L between the nodes, where each link l ∈ L specifies: a
       pair of nodes (n₁ ∈ N, n₂ ∈ N), an affinity score a_{n1→n2}
       representing the affinity of n₁ for n₂, and an affinity score
       a_{n2→n1} representing the affinity of n₂ for n₁;
       a first user u₁ represented by a node n_{u1} ∈ N; and
       a predetermined threshold number of users p
output: a second user u₂ represented by a node n_{u2} ∈ N, where n_{u1} and
       n_{u2} are connected to each other by a link l_{(nu1, nu2)}, and
       u₁ and u₂ have strong bilateral affinity (i.e., l_{(n1, n2)}.a_{n1→n2} and
       l_{(n1, n2)}.a_{n2→n1} are both relatively high as compared to other
       candidates for n₂).
// Initialize an empty list of nodes for existing users:
node EN[ ] = null;
// Find each of the nodes connected to n_{u1}
for each node n_i in G:
    if (∃ a link l between n_{u1} and n_i), then add n_i to EN[ ];
sort EN[ ] (high to low) based on each link l's affinity score a_{nu1→ni};
// Initialize a new list of p nodes to hold the top p results from EN[ ]:
node TR[p] = null;
for(int i = 0; i < p; i++): TR[i] = EN[i];
sort TR[ ] (high to low) based on each link l's affinity score a_{ni→nu1};
// Return the highest-scoring result from the sorted TR[ ] list
return TR[0];
```

Affinity System Overview

The above-described forward and bilateral affinities may be calculated using an affinity system. FIG. 5A depicts an exemplary centralized affinity system 500, in which functionality for calculating and using forward and bilateral affinities is handled directly by the social networking service. The centralized system 500 may implement some or all of the structure and/or operations of an affinity system in a single computing entity, such as entirely within a single centralized server device 526.

The affinity system 500 may include a computer-implemented system having software applications that include one or more components. Although the affinity system 500 shown in FIG. 5A has a limited number of elements in a certain topology, the affinity system 500 may include more or fewer elements in alternate topologies.

An affinity service 500 may be generally arranged to calculate, and make recommendations based, on user affinity scores or coefficients. A client device 510 may provide access for a user to a social networking service through a social networking client 520. In exemplary embodiments, each of the client devices 510 and their respective social networking clients 520 are associated with a particular user or users of the affinity service 500. In some embodiments, the client devices 510 may be cellular devices such as smartphones and may be identified to the messaging service 500 based on a phone number associated with each of the client devices 510. In some embodiments, each social networking client 520 may be associated with a user account registered with the social networking service. In general, each social networking client 520 may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a social networking server 526. The social networking server 526 may be create and maintain a social graph 144 and to use the social graph 144 to present information and make recommendations to the client 510. The social-networking server 526 may be a network-addressable computing system hosting an online social network. The social networking server 526 may generate, store, receive, and send social-networking data, such as, for example, user-profile data, concept-profile data, social-graph information, or other suitable data related to the online social network. The social networking server 526 may be accessed by the other components of the network environment either directly or via the network 524.

The social networking server 526 may include a network interface 522, social networking preferences 528, and affinity logic 530. The social networking preferences 528 may include one or more privacy settings for one or more users and/or message threads. Furthermore, the social networking preferences 528 may include one or more settings, including default settings, for the logic described herein.

The affinity logic 530 may a forward affinity component 532 configured to calculate affinities for a user based on information available about the user (e.g., a contacts list stored in the memory 519), and to use the calculated affinities in the context of the social networking service (e.g., by updating the social graph 144). The forward affinity component 532 is discussed in more detail in connection with FIG. 6.

The affinity logic 530 may further include a bilateral affinity component 534 that is operable evaluate a group of users with respect to a user under evaluation, select one or more users having mutual shared affinity with the user under evaluation, and make recommendations to, or based on, the selected users. The bilateral affinity component 534 is discussed in more detail in connection with FIG. 7.

The social networking server 526 may include an authorization server (or other suitable component(s)) that allows users to opt in to or opt out of having their actions logged by social-networking server 536 or shared with other systems (e.g., third-party systems), for example, by setting appropriate privacy settings (e.g., in the social network preferences 528). A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 144. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 526 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 526 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 526 or explicit connections of a user to a node, object, entity, brand, or page on social networking server 526. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for evaluating and using affinity scores (e.g., the logic of the forward affinity component 532 and/or the logic of the bilateral affinity component 534) are incorporated into the social networking server 526. In contrast, FIG. 5B depicts an exemplary distributed affinity system 550, in which functionality for evaluating and using forward and bilateral affinities are provided in a distinct computing device that communicates with the social networking server 526. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate affinity server 552, which hosts the forward affinity component 532 and the bilateral affinity component 534. The affinity server 552 may be distinct from the social networking server 526 but may communicate with the social networking server 526, either directly or through the network 524, to provide the functionality of the forward affinity component 532 and the bilateral affinity component 534 to the social networking server 526.

The embodiment depicted in FIG. 5B may be particularly well suited to allow exemplary embodiments to be deployed alongside existing social networking systems, for example when it is difficult or undesirable to replace an existing social networking server. Additionally, in some cases the social networking server 526 may have limited resources (e.g. processing or memory resources) that limit or preclude the addition of the additional affinity functionality. In such situations, the capabilities described herein may still be provided through the separate affinity server 552.

Next, logic for evaluating and using forward and bilateral affinities is described.

Forward and Bilateral Coefficient Logic

Figure 6:
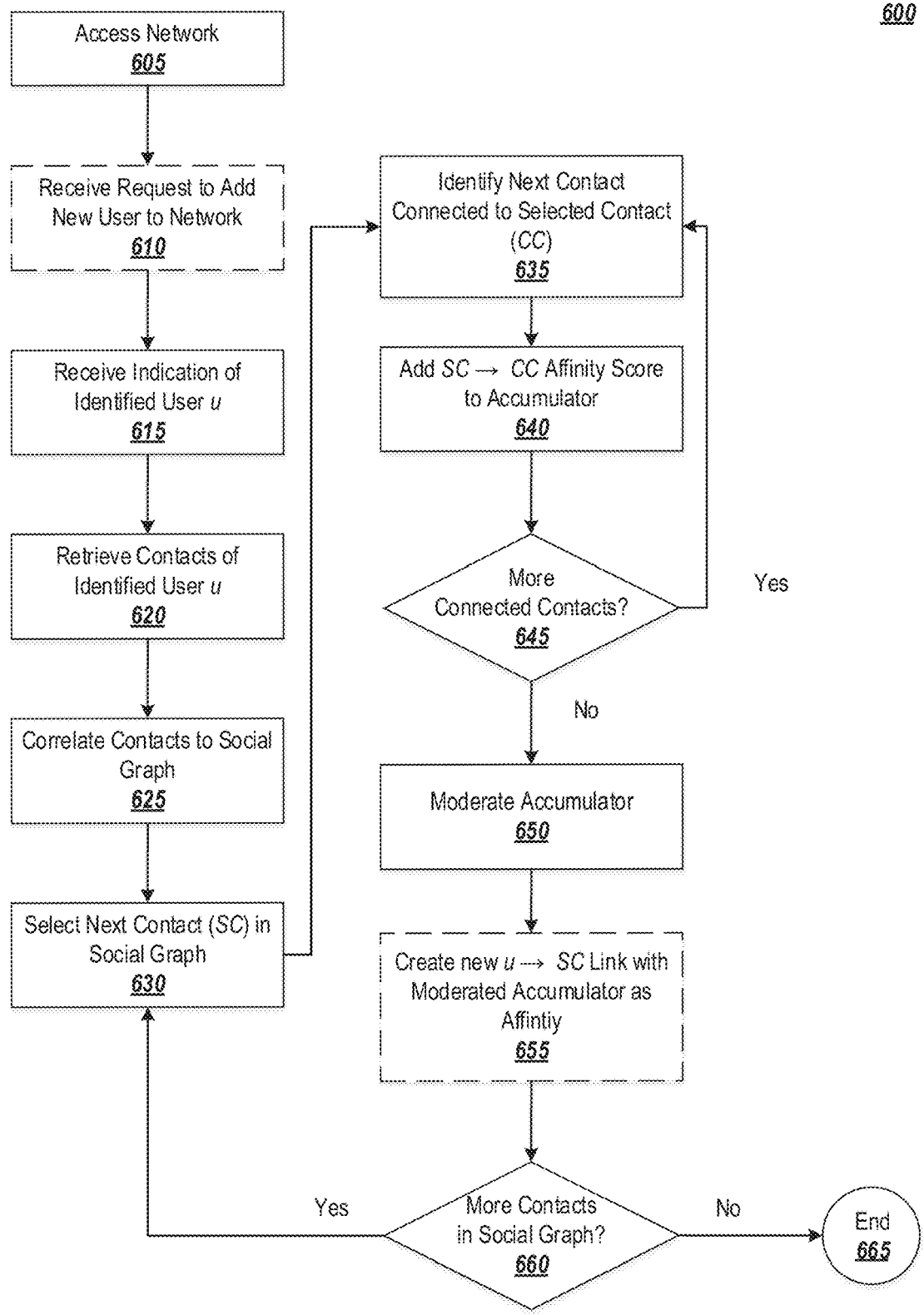
FIG. 6 is a flowchart depicting an exemplary process for determining a forward affinity of a new user for existing users in a network.

FIG. 6 depicts exemplary forward affinity logic 600, such as may be employed in the forward affinity component 532, configured to calculate an affinity score for a user and optionally modify a social graph based on the calculated affinity score.

Processing begins at step 605, in which a network is accessed. The network may be a social network including a social graph that represents users as nodes. The social graph may include links between the nodes to indicate a connection between linked users. At least some of the links may be associated with affinity scores that describe a degree of connection between the linked users.

Optionally, at step 610, a request to add a new user (u) to the network may be received. Alternatively or in addition, an existing user (u) in the social network may be identified at step 615. The user u identified at step 610 or 615 may be a user for which at least some affinity information is not yet present in the social graph. For example, the user u may not have established affinity scores or coefficients for at least some users in the social graph (e.g., users to which the identified user is connected, or users for which no connection is yet present, but a connection could be inferred based on information associated with the identified user, such as a contacts list).

At step 620, the contacts of the identified user u may be retrieved, such as from one or more clients associated with the user u. The contacts may be, for example, a list of telephone contacts, contacts in a messaging service, etc.

At step 625, the contacts retrieved at step 620 may be correlated to existing users in the social graph. For example, information from the contacts list (e.g., a user's name, telephone number, email address, messenger handle, etc.) may be matched to information stored in a profile of the existing users. If a match is made, the existing user may be added to a list for further evaluation.

At step 630, the next correlated contact may be selected as a selected contact (SC). For example, if an evaluation list was created at step 625, the next user in the list may be selected. At this step, an accumulator and a "number of contacts" counter may be initialized.

At step 635, the next contact connected to the selected contact SC may be selected as a connected contact (CC). For example, starting at the selected contact SC, the social graph may be traversed to identify any contacts connected to the selected contact SC. These contacts may be added to a connected contact list, and the next contact on the list may be selected for evaluation.

At step 640, the affinity score proceeding from the selected contact SC to the connected contact CC may be retrieved (i.e., the SC→CC Affinity Score). This value may be added to the accumulator, and the number of contacts counter may be incremented.

At step 645, it may be determined whether more connected contacts CC that are connected to the selected contact SC exist for evaluation. For example, the list created at step 630 may be evaluated to determine whether more contacts exist in the list. If so, processing returns to step 635 and the next connected contact CC is selected for evaluation. If not, processing proceeds to step 650.

At step 650, all of the contacts connected to the selected contact SC have been evaluated and the total sum of their affinities have been added to the accumulator. A linear increase in the value of the accumulator may be moderated by applying a moderation function that is dependent on the number of connected contacts CC as represented by the number of contacts counter. The moderation function may be, for example, a function of a root (e.g., a square root) of the number of connected contacts CC, or a function of an inverse of the number of connected contacts CC.

Optionally, a new link between the identified user u and the selected contact SC may be created at step 655, if no such link already exists. Regardless of whether the link exists or not, the moderated accumulator value calculated at step 650 may be applied as the u→SC affinity score associated with the link.

At step 660, it may be determined whether any addition contacts that were identified at steps 620-625 remain for evaluation. If so, processing returns to step 630 and the next contact is selected as a new selected contact SC. The accumulator and number of contacts counter may be re-initialized for the new contact. If not, processing proceeds to step 665 and ends.

Turning now to FIG. 7, the affinity scores calculated in the above or another manner may be utilized by exemplary bilateral affinity logic 700, such as may be employed in the bilateral affinity component 534. The bilateral affinity logic 700 is configured to evaluate mutual affinities between users and make recommendations based on the mutual affinities.

Processing begins at step 705, in which a network is accessed. The network may be a social network including a social graph that represents users as nodes. The social graph may include links between the nodes to indicate a connection between linked users. At least some of the links may be associated with affinity scores that describe a degree of connection between the linked users.

At step 710, an identified user (u) in the social network may be identified. The user u identified at step 710 may be, for example, a user that is identified as being at risk of disengaging with, or becoming inactive on, the social network or a messaging service. For example, the user u may be associated with an activity score, and the user may be identified at step 710 when the user's activity score falls below a predetermined threshold. Alternatively or in addition, the identified user u may be a user that is selected to receive a promotion.

At step 715, any users that are connected to the identified user u in the social network's social graph may be identified as connected users (CU). For example, the identified user u's social graph may be traversed to identify any users connected to the user u by links. The discovered connected users CU may be added to a list for evaluation.

At step 720, the connected users identified in step 715 may be ranked based on the affinity from the identified user u for each the connected users CU (i.e., the u→CU Affinity Coefficient). For example, the list created at step 715 may be reordered based on respective affinity scores.

At step 725, a predetermined number of the top users from the ranked list created at step 720 may be selected for further consideration. The predetermined number may be number selected depending on the context of the recommendation to be made. In some embodiments, the predetermined number may be dynamically selected depending on the number of user contacts under consideration. Alternatively or in addition, a predetermined threshold affinity may be selected, and only users at or above the predetermined threshold affinity may be selected for further consideration.

At step 730, the remaining users in the list may be re-ranked depending on the affinity of each of the connected users CU for the identified user u (i.e., the CU→u Affinity Coefficient). A predetermined number of target users from the top of the re-ranked list may be selected at step 735. In some embodiments, the predetermined number is one, such that the highest-ranked user in the re-ranked list is selected as the target user.

At step 740, a recommendation may be made based on the target user and the identified user. For example, the recommendation may be a recommendation that the target user contacts, messages, or otherwise communicates with the identified user. In another embodiment, the likes or dislikes of the target user may be analyzed in order to offer a promotion to the identified user. Processing may then proceed to step 745 and terminate.

Figure 8A:
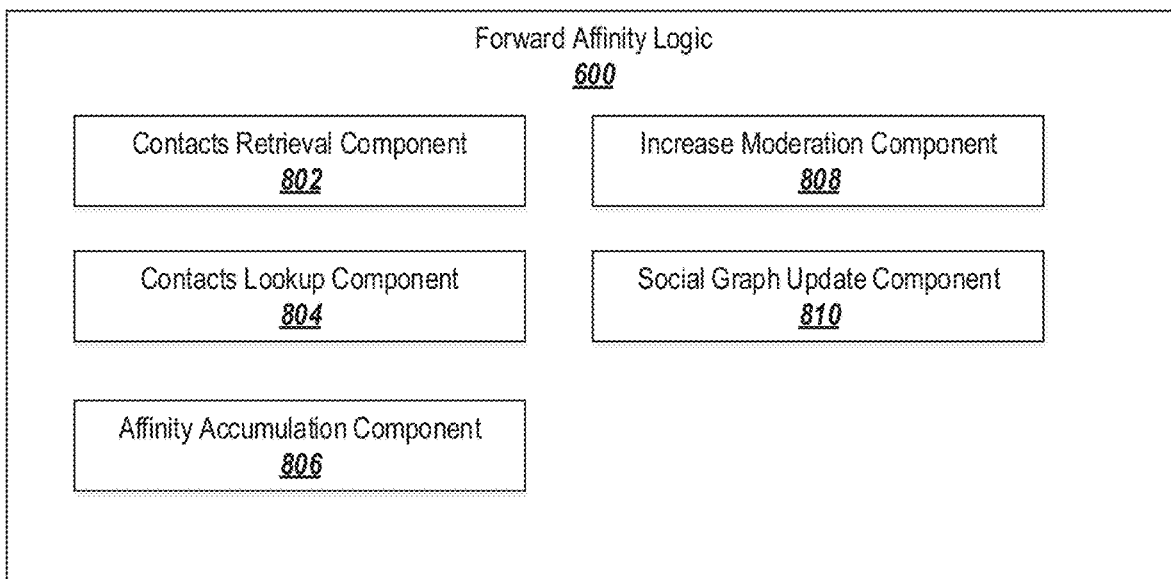
FIG. 8A is a block diagram depicting exemplary logic for calculating a forward affinity.

The forward affinity logic 600 may be implemented using a set of components, as illustrated in FIG. 8A. The components may include hardware, software, or a combination of hardware and software.

The components may include, for example, a contacts retrieval component 802 for retrieving a list of contacts from a client. The contracts retrieval component 802 may implement functionality similar to that described in connection with FIG. 3A and/or at step 620.

The components may further include a contacts lookup component 804 for correlating the contacts retrieved by the contacts retrieval component 802 to elements in a data structure such as nodes in a social graph. The contacts lookup component 804 may implement functionality similar to that described in connection with step 625.

The components may further include an affinity accumulation component 806 for accumulating affinity values across users within a cohort. The affinity accumulation component 806 may implement functionality similar to that described in connection with steps 630-645.

The components may further include an increase moderation component 808 for moderating an increase of the value calculated by the affinity accumulation component 806. The increase moderation component 808 may implement functionality similar to that described in connection with step 650.

The components may further include a social graph update component 810 for updating the affinities in, and/or adding links to, a social graph based on the affinity value calculated by the increase moderation component 808. The social graph update component 810 may implement functionality similar to that described in connection with step 655.

Figure 8B:
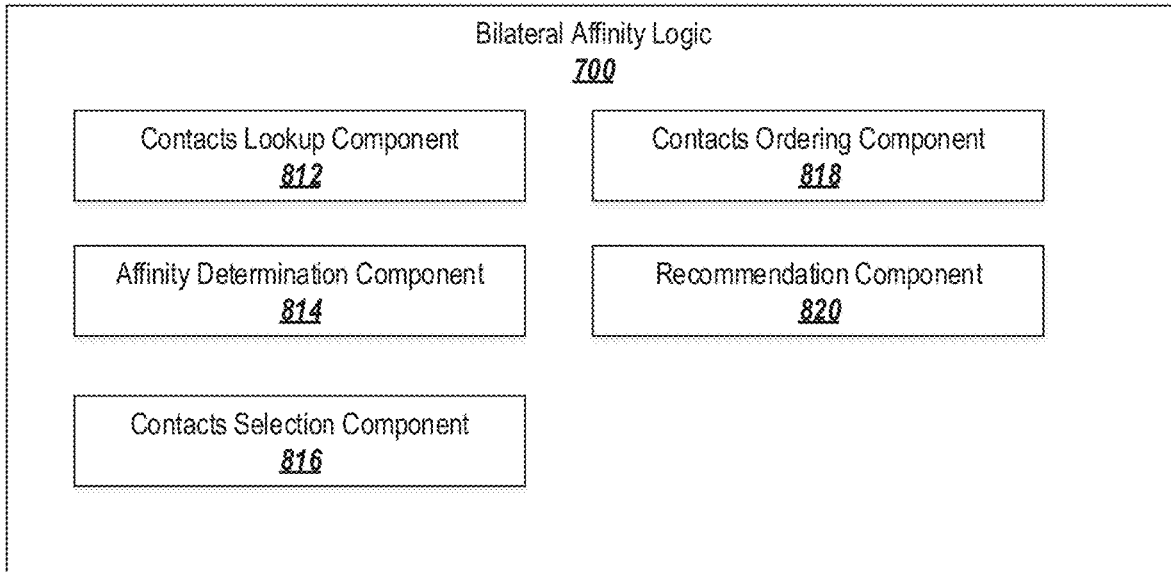
FIG. 8B is a block diagram depicting exemplary logic for determining a bilateral affinity and for making a recommendation based on the bilateral affinity.

The bilateral affinity logic 700 may be implemented using a set of components, as illustrated in FIG. 8B. The components may include hardware, software, or a combination of hardware and software.

The components may include, for example, a contacts lookup component 812 for retrieving the contacts of an identified user in a social graph. The contacts lookup component 812 may implement functionality similar to that described in connection with step 715.

The components may further include an affinity determination component 814 for determining the affinity of one user in the social graph for another user. The affinity determination component 814 may be used to implement functionality similar to the affinity determinations made in connection with steps 720 and 730.

The components may further include a contacts selection component 816 for selecting a predetermined number of users from a list. The contacts selection component 816 may implement functionality similar to that described in connection with steps 725 and 735.

The components may further include a contacts ordering component 818 for ranking the contacts in a list based on their affinities. The contacts ordering component 818 may implement functionality similar to the reordering of the lists described in connection with steps 720 and 730.

The components may further include a recommendation component 820 for selecting a user to whom a recommendation may be made, determining the parameters of the recommendation, and making the recommendation. The recommendation component 820 may implement functionality similar to that described in connection with steps 710 and 740.

Various aspects of the computing infrastructure in which the above-described affinity scores may be employed or calculated are next described with reference to FIGS. 9-12.

Messaging Architecture

Figure 9:
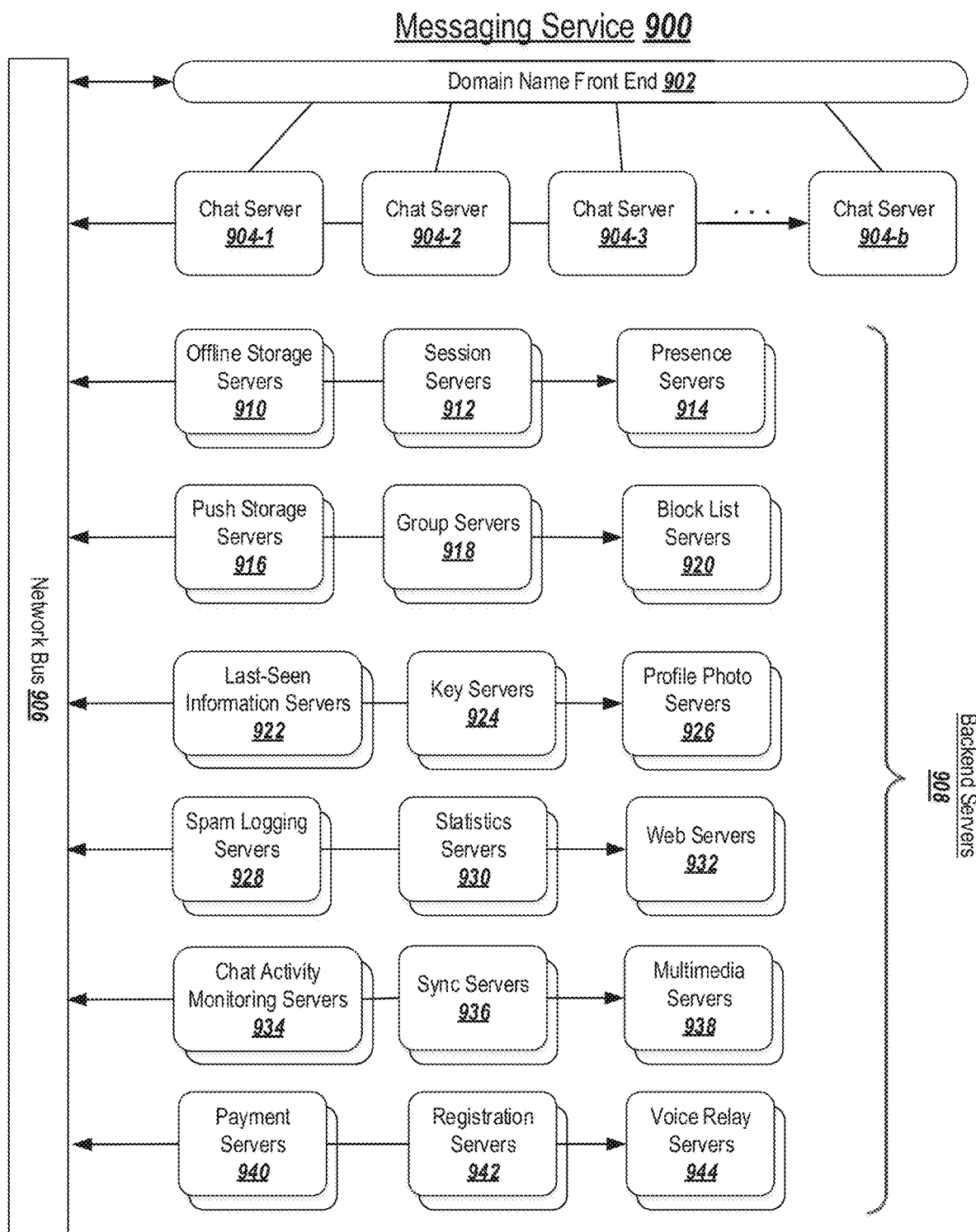
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise frontend servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, and audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Computing Architecture

Figure 10:
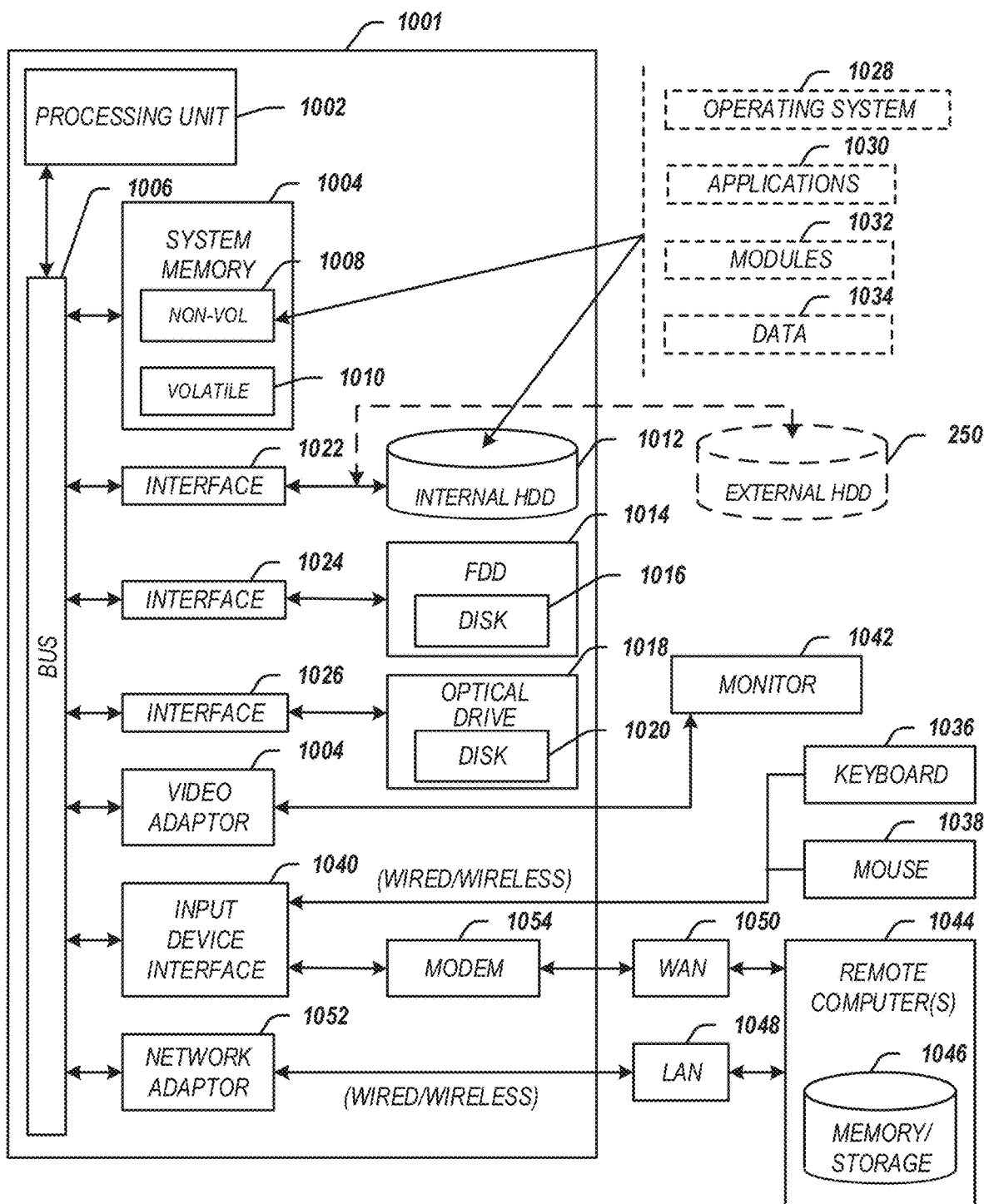
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
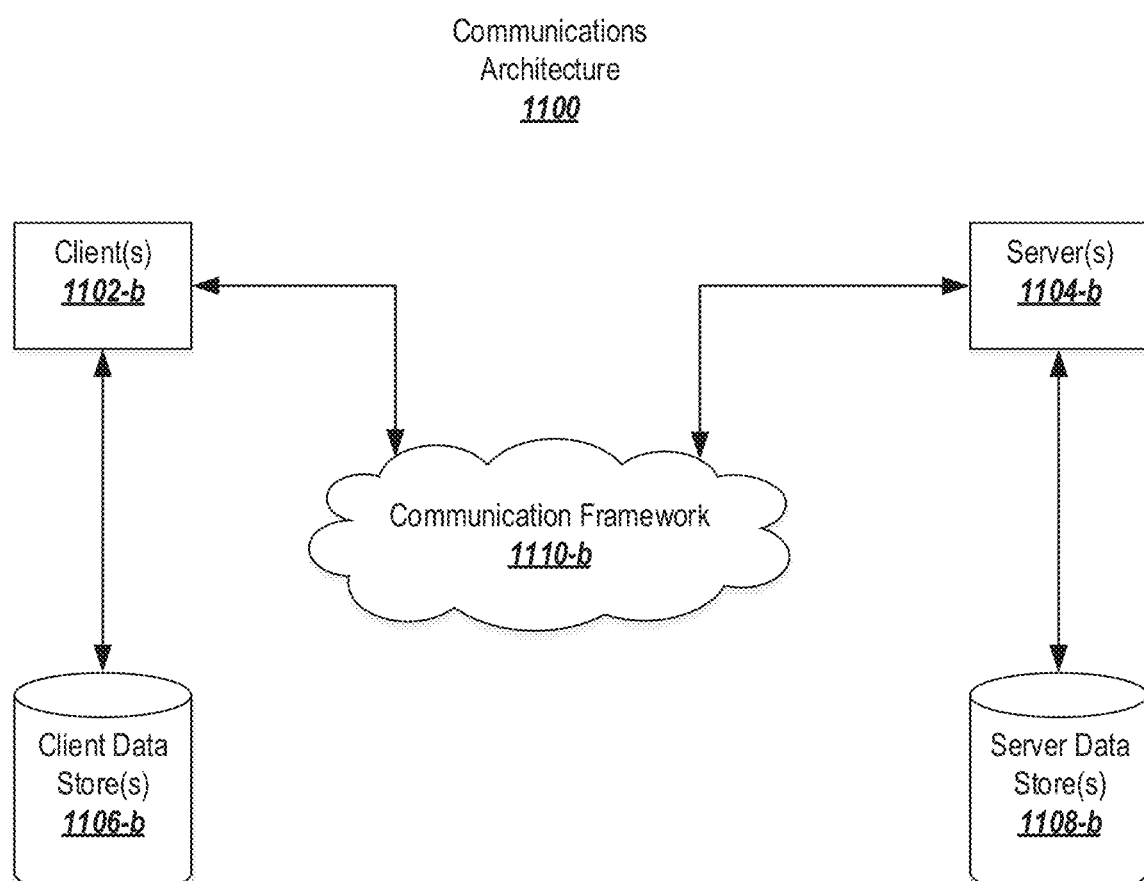
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
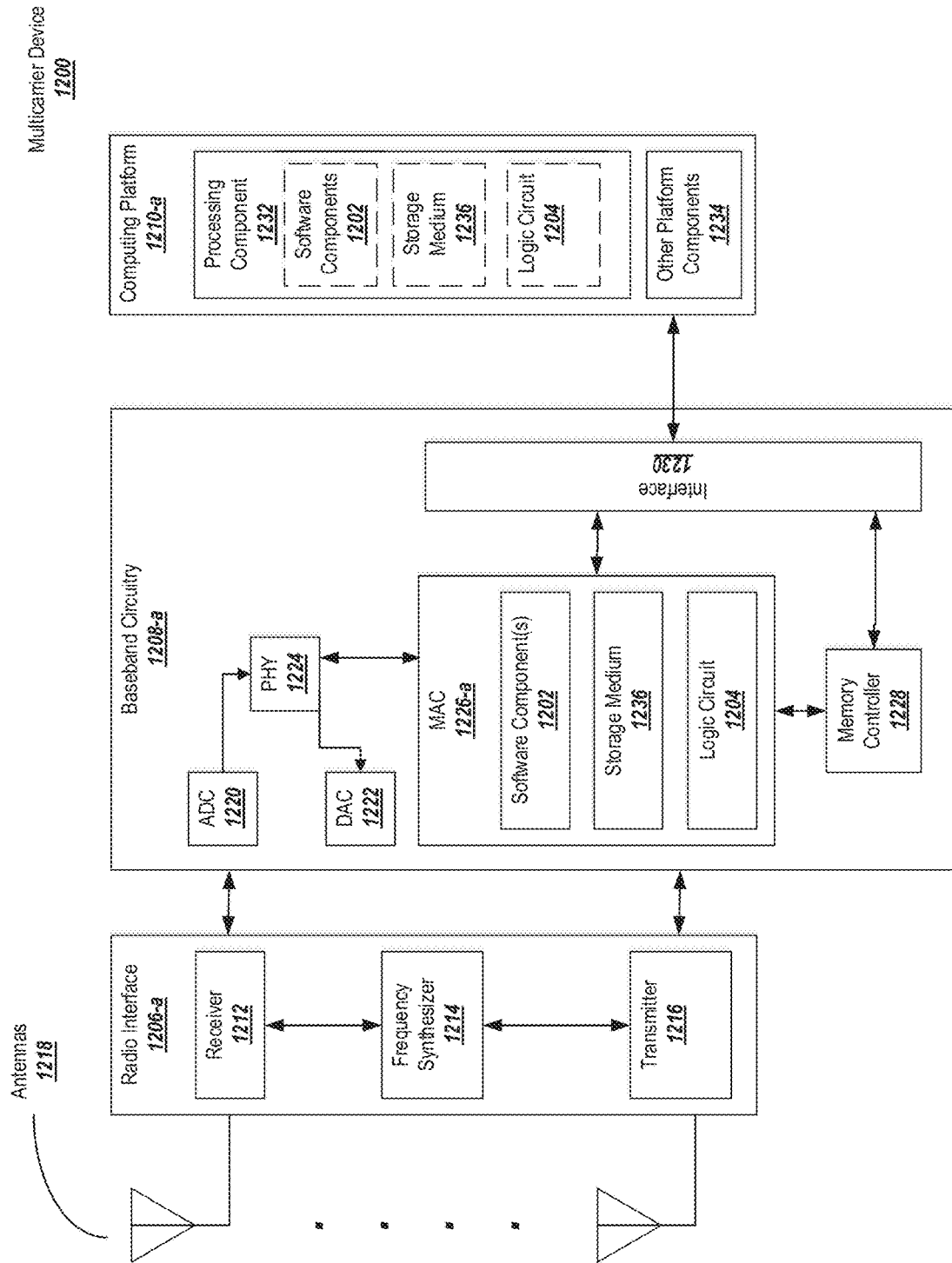
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
accessing a social network, the social network comprising users associated with affinity scores that describe a degree of connection from one user to another user;
receiving an indication of an identified user in the social network;
accessing a list of contacts of the identified user;
determining a group of users comprising one or more contacts of the identified user who are also users in the social network and for which the identified user has no affinity score;
selecting a first user from among the determined group of users;
calculating an affinity value from the identified user to the first user based on a sum of the affinity scores from the first user to one or more other users from the determined group of users, moderated by a moderation function, the moderation function being based on the number of users in the determined group of users for which the first user has an affinity score; and
assigning the affinity value as the affinity score from the identified user to the first user.

2. The method of claim 1, wherein the identified user is a new user of the network and the identified user lacks a connection to, or affinity score for, the first user.

3. The method of claim 1, wherein the one or more contacts are retrieved from a contacts list associated with the identified user.

4. The method of claim 3, wherein the contacts list is for a messaging service or is a mobile device contacts list.

5. The method of claim 1, wherein the moderation function is one of:
a function of a square root of a number of users from the determined group of users to whom the first user is connected, or
a function of an inverse of a number of users from the determined group of users to whom the first user is connected.

6. A non-transitory computer-readable medium storing instructions, the instructions comprising instructions to:
access a social network, the social network comprising a social graph representing users as nodes and including links between the nodes to indicate a connection between linked users, wherein at least some of the links are associated with affinity scores that describe a degree of connection from one user to another user;
receive an indication of an identified user in the social network;
access a list of contacts of the identified user;
determine a group of users comprising one or more contacts of the identified user who are also users in the social network and for which the identified user has no affinity score;

select a first user from among the determined group of users;

calculate an affinity value from the identified user to the first user based on a sum of the affinity scores from the first user to one or more other users from the determined group of users, moderated by a moderation function, the moderation function being based on the number of users in the determined group of users for which the first user has an affinity score; and assign the affinity value as the affinity score from the identified user to the first user in the social network.

7. The non-transitory medium of claim 6, wherein the contacts list is for a messaging service or is a mobile device contacts list.

8. The non-transitory medium of claim 6, wherein the moderation function is one of:
  a function of a square root of a number of users from the determined group of users to whom the first user is connected, or
  a function of an inverse of a number of users from the determined group of users to whom the first user is connected.

9. A system comprising:
  a storage configured to:
    store a social network, the social network comprising users associated with affinity scores that describe a degree of connection from one user to another user;
  a network interface configured to:
    receive an indication of an identified user in the social network;
  a contacts lookup component configured to:
    access a list of contacts of the identified user; and
    determine a group of users comprising one or more contacts of the identified user who are also users in the social network and for which the identified user has no affinity score;
  an affinity accumulation component configured to:
    select a first user from among the determined group of users: and
    calculate an affinity value from the identified user to the first user based on a sum of the affinity scores from the first user to one or more other users from the determined group of users, moderated by a moderation function, the moderation function being based on the number of users in the determined group of users for which the first user has an affinity score; and
  a graph update component configured to:
    assign the affinity value as the affinity score from the identified user to the first user.

10. The system of claim 9, wherein the moderation function is one of:
  a function of a square root of a number of users from the determined group of users to whom the first user is connected, or
  a function of an inverse of a number of users from the determined group of users to whom the first user is connected.

* * * * *